United States Patent
Reeve et al.

(10) Patent No.: US 7,124,241 B1
(45) Date of Patent: Oct. 17, 2006

(54) APPARATUS AND METHODOLOGY FOR A WRITE HUB THAT SUPPORTS HIGH SPEED AND LOW SPEED DATA RATES

(75) Inventors: Rick Reeve, San Francisco, CA (US); Richard L. Schober, Cupertino, CA (US); Ian Colloff, Los Gatos, CA (US); Prasad Vajjhala, San Jose, CA (US)

(73) Assignee: Avago Technologies General IP (Singapore) Pte.Ltd., Singapore (SG)

( * ) Notice: Subject to any disclaimer, the term of this patent is extended or adjusted under 35 U.S.C. 154(b) by 628 days.

(21) Appl. No.: 10/431,875

(22) Filed: May 7, 2003

(51) Int. Cl.
*G06F 13/14* (2006.01)
(52) U.S. Cl. .................................. 711/110
(58) Field of Classification Search ............. 711/110
See application file for complete search history.

(56) References Cited

U.S. PATENT DOCUMENTS 4,839,866 A * 6/1989 Ward et al. ............. 365/221
6,272,569 B1 * 8/2001 Nordling ................. 710/69
2004/0039867 A1 * 2/2004 Apfeldorfer et al. ......... 711/1
2005/0146950 A1 * 7/2005 Fukushima ............. 365/189.12

* cited by examiner

*Primary Examiner*—Kevin L. Ellis

(57) ABSTRACT

A write hub is described. The write hub has a plurality of registers. Each one of the registers helps generate a write address to a different memory bank from amongst a plurality of memory banks. Each of the registers are arranged in a ring so that each register can pass a pointer value toward a next register within the ring. The ring of registers further comprise a multiplexer between each of the registers. Each multiplexer has an output path that flows toward a next register within the ring relative to the multiplexer. Each multiplexer can introduce a pointer value to the ring at a next register within the ring.

85 Claims, 14 Drawing Sheets

FIG. 6A (SCHEDULER RING)

| MEMORY BANK \ CYCLE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BANK 1 | W | | | | W | | | | W | | | | W | | | |
| BANK 2 | | W | | | | W | | | | W | | | | W | | |
| BANK 3 | | | W | | | | W | | | | W | | | | W | |
| BANK 4 | | | | W | | | | W | | | | W | | | | W |

FIG. 6B (WRITE_HUB RING)

▨ = ACTIVE REGISTER

| HUB REG. \ CYCLE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BANK 1 | ▨P1 | P1 | P1 | P1 | ▨ | | | | | | | | | | | |
| BANK 2 | | ▨ | P1 | P1 | P1 | P1 | ▨ | | | | | | | | | |
| BANK 3 | | | | ▨ | P1 | P1 | P1 | P1 | ▨ | | | | | | | |
| BANK 4 | | | | | | ▨P1 | P1 | P1 | P1 | ▨ | | | | | | |
| | | | | | | | | | | | ▨P1 | P1 | P1 | P1 | ▨ | |
| | | | | | | | | | | | | | ▨ | P1 | P1 | ▨P1 |

FIG. 6C

| HUB REG. \ CYCLE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BANK 1 | P1 | P1 | P1 | P1 | | | | | | | | | | | P2 | P2 |
| BANK 2 | | | P2 | P2 | P1 | P1 | P1 | P1 | | | | P4 | P4 | P4 | P4 | P4 |
| BANK 3 | | | | | | | P2 | P3 | P3 | P3 | P3 | P3 | P4 | P3 | P3 | P3 |
| BANK 4 | | | | | P2 | P2 | | P2 | P1 | P1 | P1 | P1 | P1 | P1 | P1 | P1 |

(WRITE_HUB_RING) ▨ = ACTIVE REGISTER

FIG. 6D

| HUB REG. \ CYCLE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BANK 1 | P1 | | | | P1 | | | | P1 | | | | P1 | | | |
| BANK 2 | | P1 | | | | P1 | | | | P1 | | | | P1 | | |
| BANK 3 | | | P1 | | | | P1 | | | | P1 | | | | P1 | |
| BANK 4 | | | | P1 | | | | P1 | | | | P1 | | | | P1 |

(WRITE_HUB_RING) ▨ = ACTIVE REGISTER

APPARATUS AND METHODOLOGY FOR A WRITE HUB THAT SUPPORTS HIGH SPEED AND LOW SPEED DATA RATES

FIELD OF INVENTION

The field of invention relates generally to networking; and, more specifically, to an apparatus and methodology for an Infiniband input port that supports high and low speed data rates.

BACKGROUND

Computing systems are typically viewed as a processing core that is coupled to a plurality of "Input/Output" (I/O) devices. The processing core is often viewed as the central intelligence function of the computing system, while the I/O devices are often viewed as a means for sending information to the processing core and/or receiving information from the processing core.

A good example is a large computing system such as a UNIX based server or workstation. The processing core of a large computing system is usually implemented as a plurality of general purpose processor chips and a system memory that together execute the system's software routines. The I/O devices of a server or workstation are often implemented as some sort of "plug in" device (peripheral or otherwise). Examples of I/O devices within a server environment tend to include a graphics display, a networking interface, a data storage device (e.g., disk array unit), etc.

Large computing systems have traditionally used a bus to communicatively couple most all of the I/O devices to the processing core. For example, if a server's software requires a file from a disk drive unit, the file is transported from the disk drive unit to the processing core over a bus. Because a bus is a passive group of wires that are physically coupled to a plurality of I/O devices (or a plurality of I/O device connectors), typically, a number of different I/O devices are designed to communicate with the processing core over the same bus.

As such, system congestion (wherein two or more different I/O devices are contending for the resources of the bus) is not an unlikely occurrence. For example, if a disk drive unit and networking interface share the same bus; and, if both have information to send to the processing core at approximately the same time; then, one of the I/O devices has to wait for the other before its communication can commence (e.g., the networking adapter card, before sending information to the processing core, has to wait until the disk drive unit has sent its information to the processing core).

In cases where the processing core is of lower performance, no real loss in computing system performance is observed. That is, in a sense, if the processing core is only capable of handling the information from the I/O devices "one at a time" (e.g., if the processing core in the above example does not posses the resources to process the networking adapter card's information even if it was received "in parallel" with the disk drive unit's information), then the computing system may be said to be "processing core constrained"; and, there is no real loss in system performance as a result of the inefficiencies associated with the communication of the I/O devices over a shared bus.

The trend, however, is that processing core performance of large computing systems is outpacing bus performance. Semiconductor manufacturing technology improvements (which provide faster and more functionally robust processor chips) as well as "multi-processor" processing core designs (e.g., wherein a plurality of processor chips are designed to work together as a cooperative processing whole) have resulted in high performance processing core implementations that can simultaneously handle the emissions from two or more I/O devices.

As such, true losses in computing system performance are being observed for those high performance systems having a bus design between the processing core and the I/O devices of the system. In order to combat this trend, various system design approaches that "work around" the use of a bus as the principle means of communication between the processing core and the I/O devices have been proposed. One of these, referred to as "Infiniband", embraces the use of a switching fabric between the processing core and the I/O devices. FIG. 1 shows an example of an Infiniband or other switching fabric based architecture.

The processing core of the computing system 100 shown in FIG. 1 may be viewed as the collection of hosts $101_1$ through $101_6$. Each of the hosts $101_1$ through $101_6$ has an associated processor $103_1$ through $103_6$ that may be assumed to have its own associated memory. Each of the hosts $101_1$ through $101_6$ are coupled to a switching fabric 104 via their own host channel adapter (HCA) $102_1$ through $102_6$. In a sense, each of the HCAs $102_1$ through $102_6$ act as a media access layer for their corresponding processor (e.g., by preparing and receiving packets that are sent/received to/from the switching fabric 104).

The I/O devices of the computing system are referred to as its "targets" $107_1$ through $107_6$. Each of the targets $107_1$ through $107_6$ has an associated I/O unit $108_1$ through $108_6$ (e.g., a gateway to another network, a file server, a disk array, etc.) and target channel adapter (TCA) $109_1$ through $109_6$. Similar to the HCAs $102_1$ through $102_6$, the TCAs $109_1$ through $109_6$ act as a media access layer for their corresponding I/O (e.g., by preparing and receiving packets that are sent/received to/from the switching fabric 104).

The I/O units $108_1$ through $108_6$ are communicatively coupled to the processors $103_1$ through $103_6$ through the switching fabric 104. A switching fabric 104 is a network of switching nodes such as switching nodes $105_1$ through $105_5$. Consistent with the use and purpose of a network, the switching nodes $105_1$ through $105_5$ are responsible for directing packets toward their appropriate destination. For example, if I/O unit $108_6$ desires to send information to processor unit $103_1$, one or more packets that contain the information are directed over the switching fabric 104 from network access link $106_{12}$ to network access link $106_1$.

As such, switching node $105_5$ will direct these packets (upon their reception from access link $106_{12}$) toward switching node $105_2$ (e.g., by directing them to switching node $105_1$ which subsequently directs them to switching node $105_2$). A number of sophisticated computer architecture approaches are possible through the use of the switching fabric 104. These include (among possible others): 1) the implementation of a multi-processor computing system (because the switching fabric 104 allows the processors $103_1$ through $103_6$ to efficiently communicate with one another); 2) intelligent I/O units (because the switching fabric 104 allows the I/O units $108_1$ through $108_6$ to efficiently communicate with one another); 3) scalability (i.e., if an increase in processing performance is desired, more processors can be coupled to the network, if I/O needs to be expanded, more I/O units can be added to the fabric, with the fabric being expanded to meet the increased connectivity, and/or, if faster communication is desired through the network 104, more switches can be added to the network 104); and 4) partitioning (wherein a subset of processors are identified as being part of a unique multi-processing core resource that can operate privately).

The switching fabric 104 also provides a performance advantage over bus architectures because a large number of communications can be simultaneously carried between the various processors and I/O units. That is, a particular processor or I/O unit typically does not have to "wait" to send information until another unit has completed its own transmission of information. As a result, the various units are allowed to simultaneously inject their information into the network.

FIGURES

The present invention is illustrated by way of example, and not limitation, in the Figures of the accompanying drawings in which.

Figure 5:
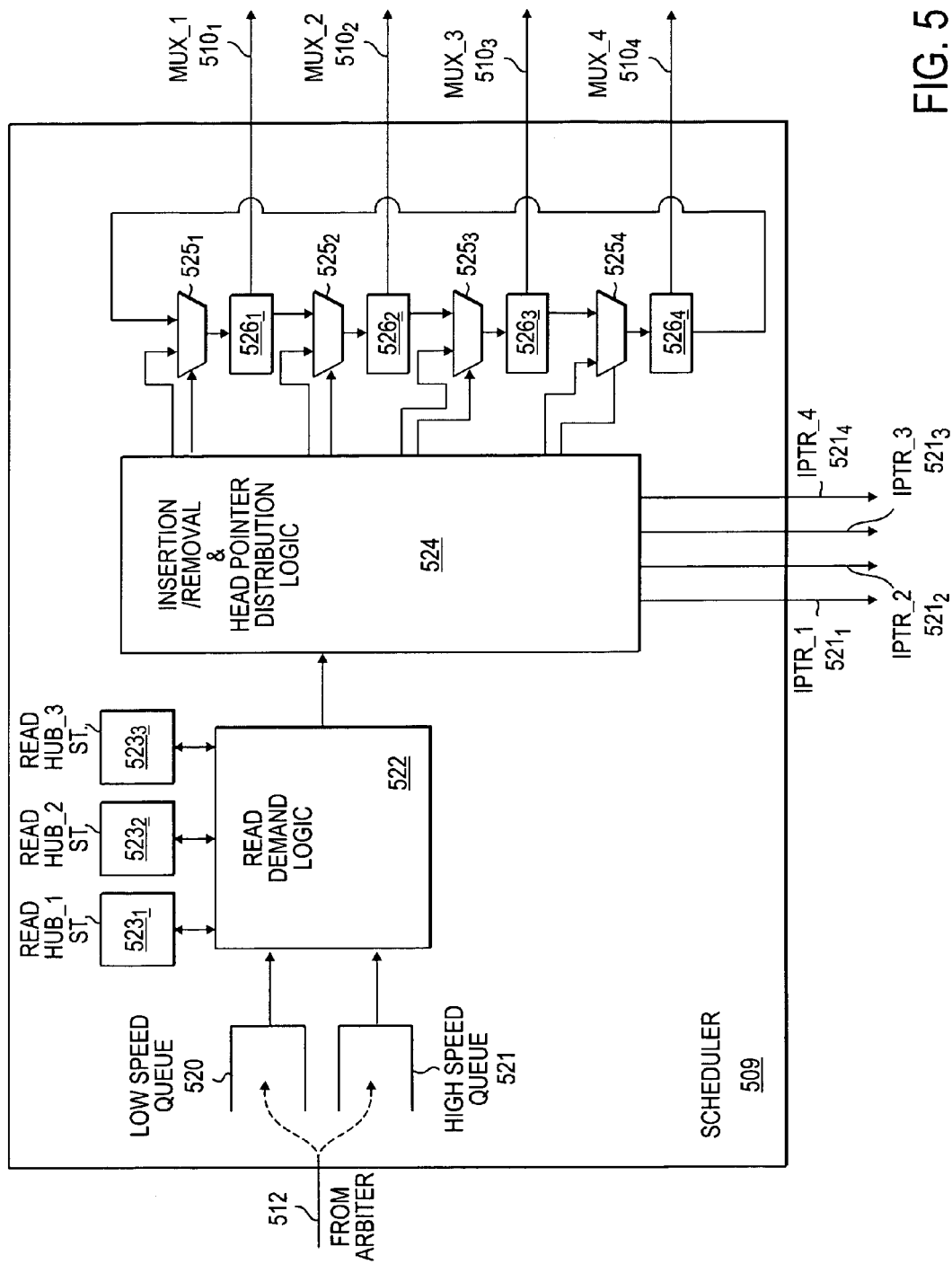
FIG. 5 shows an example of a design for a scheduler that may be used within the input port of FIG. 3.
Figure 7:
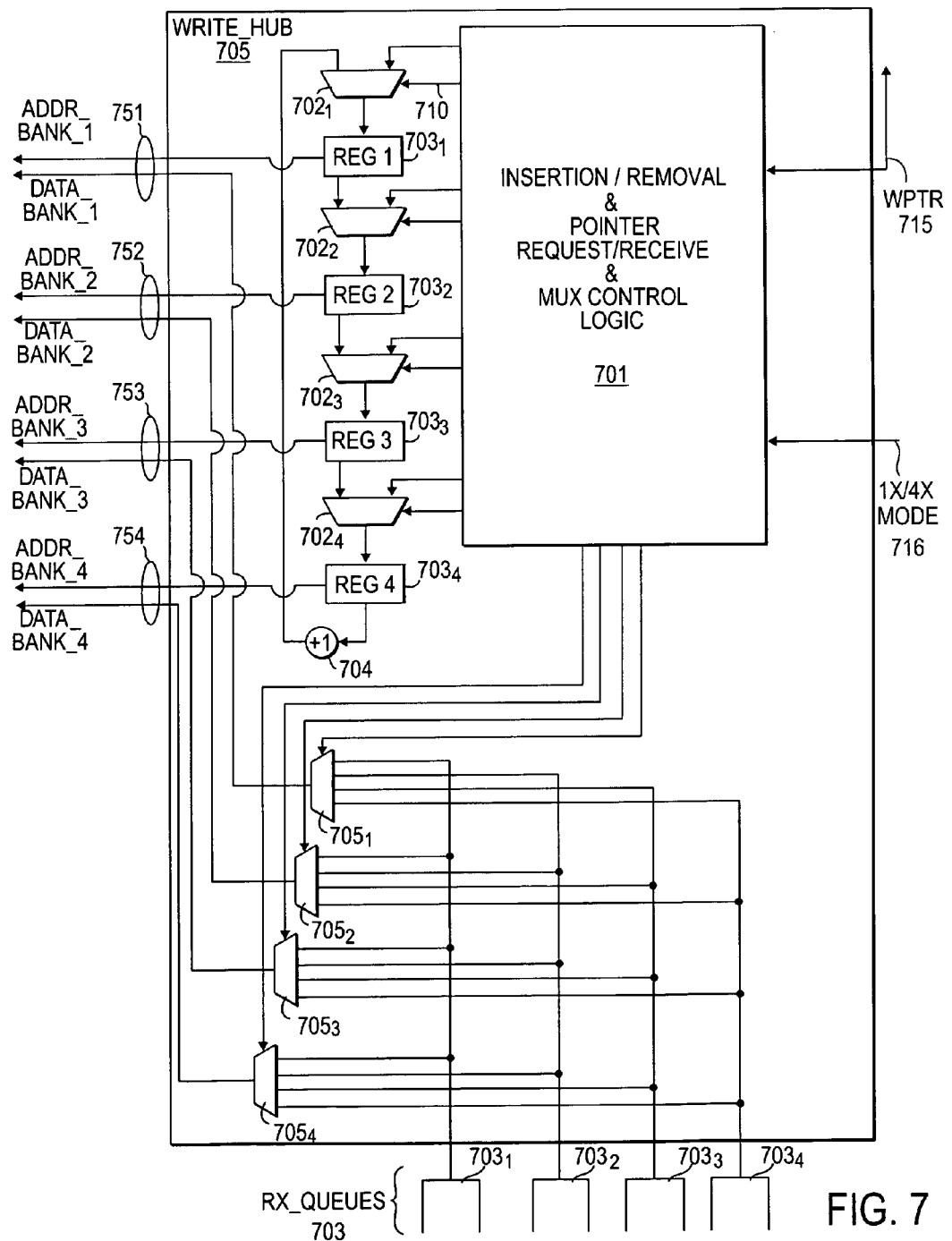
Figure 8A:
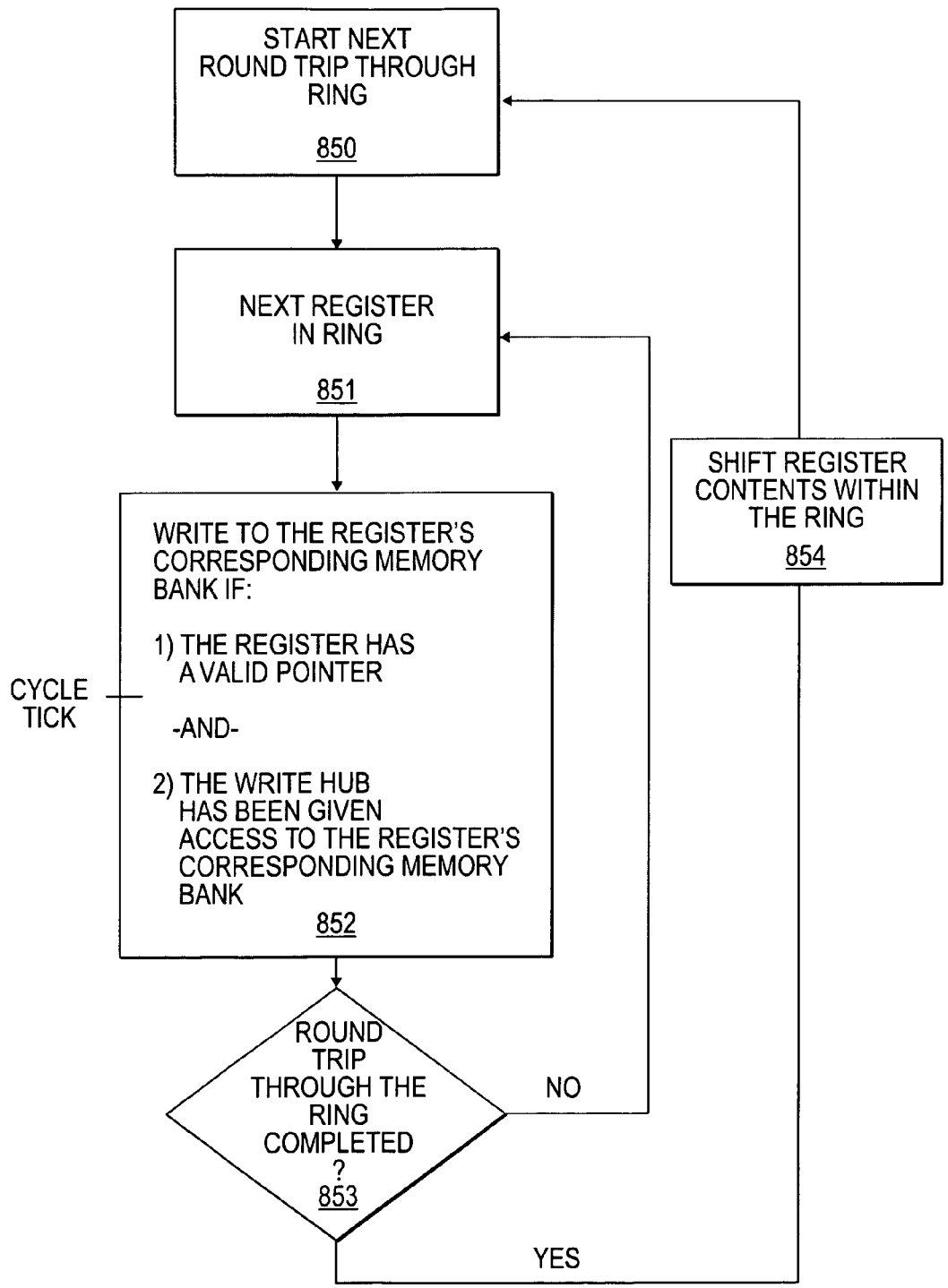
Figure 8B:
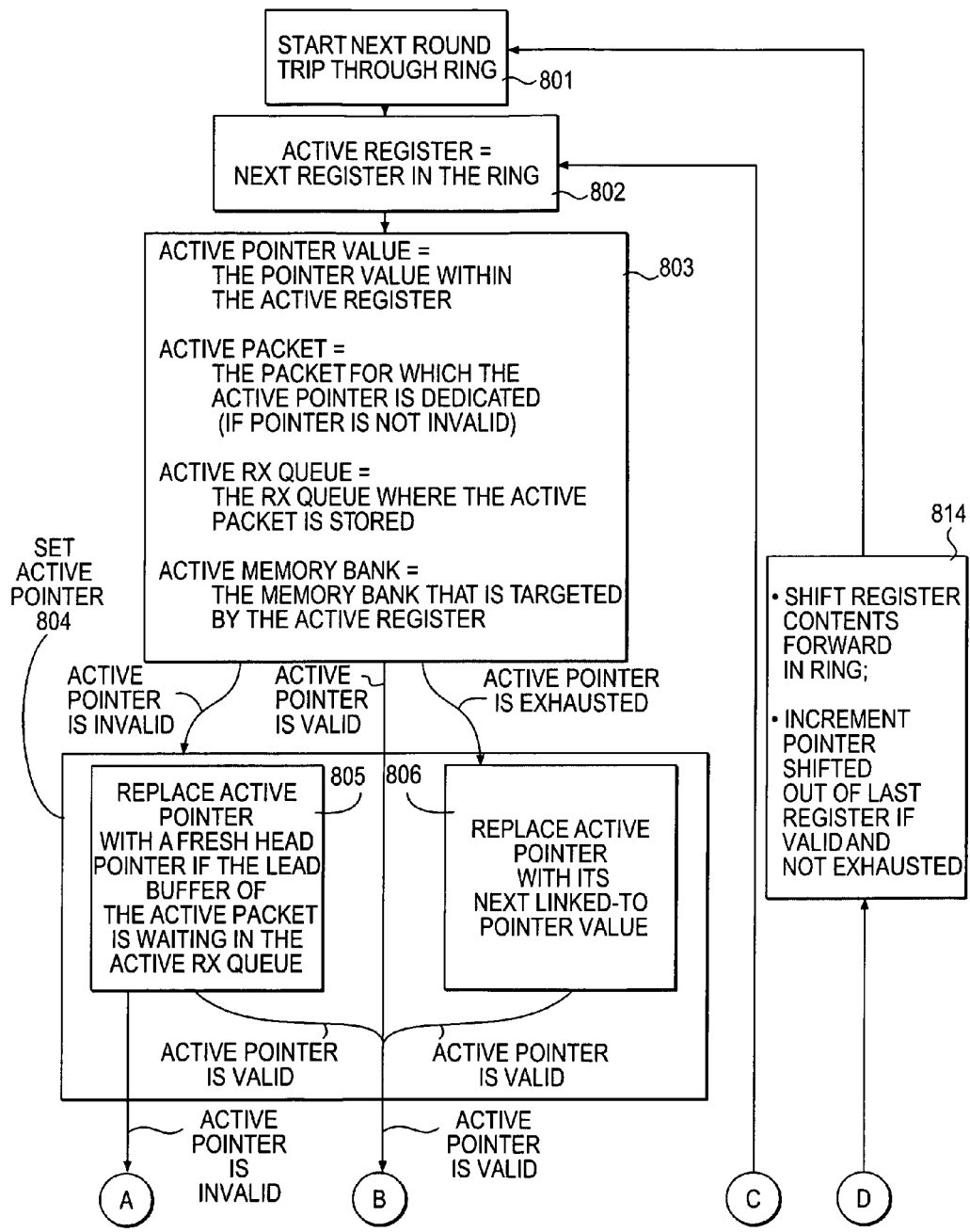
Figure 8B:
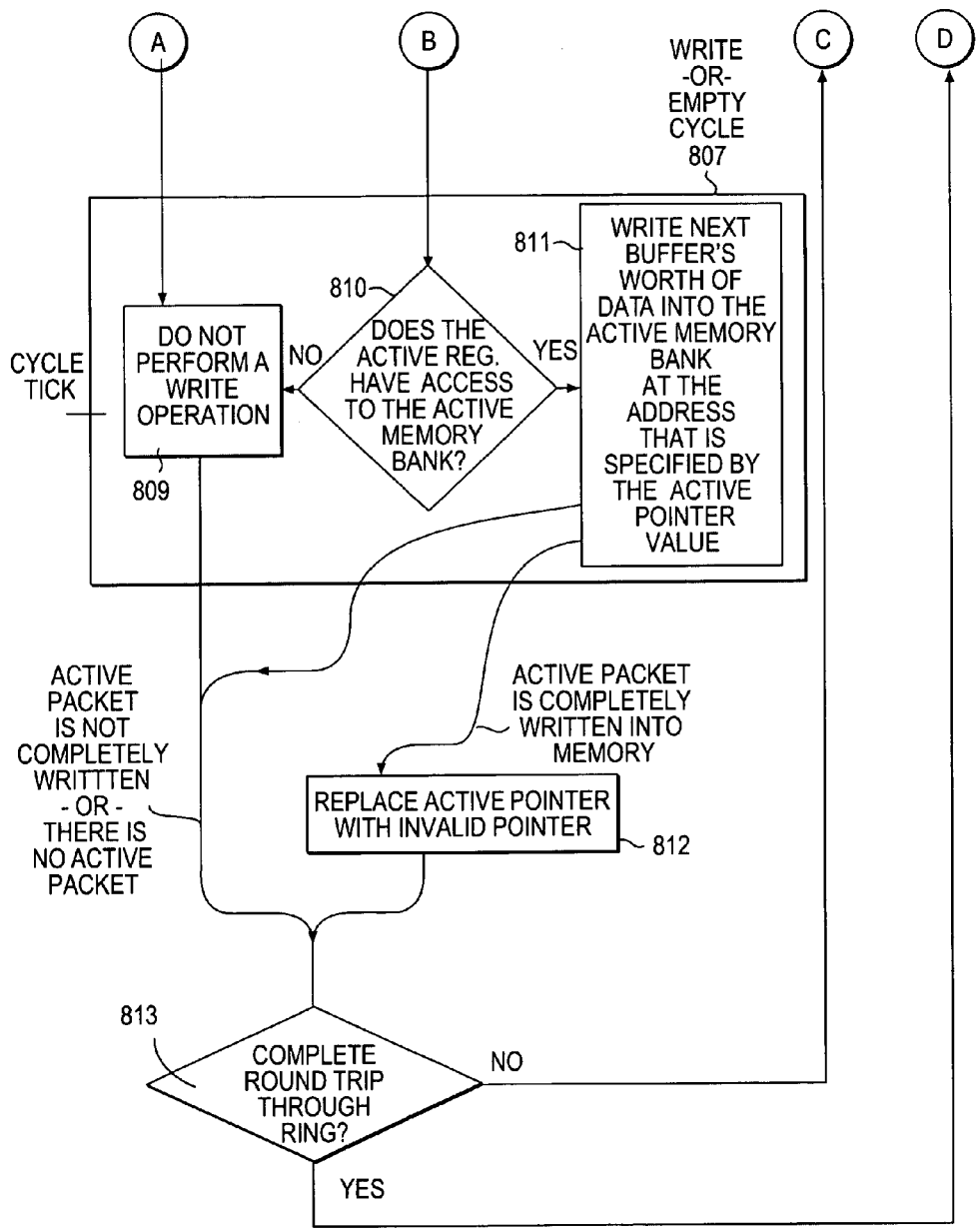
Figure 9A:
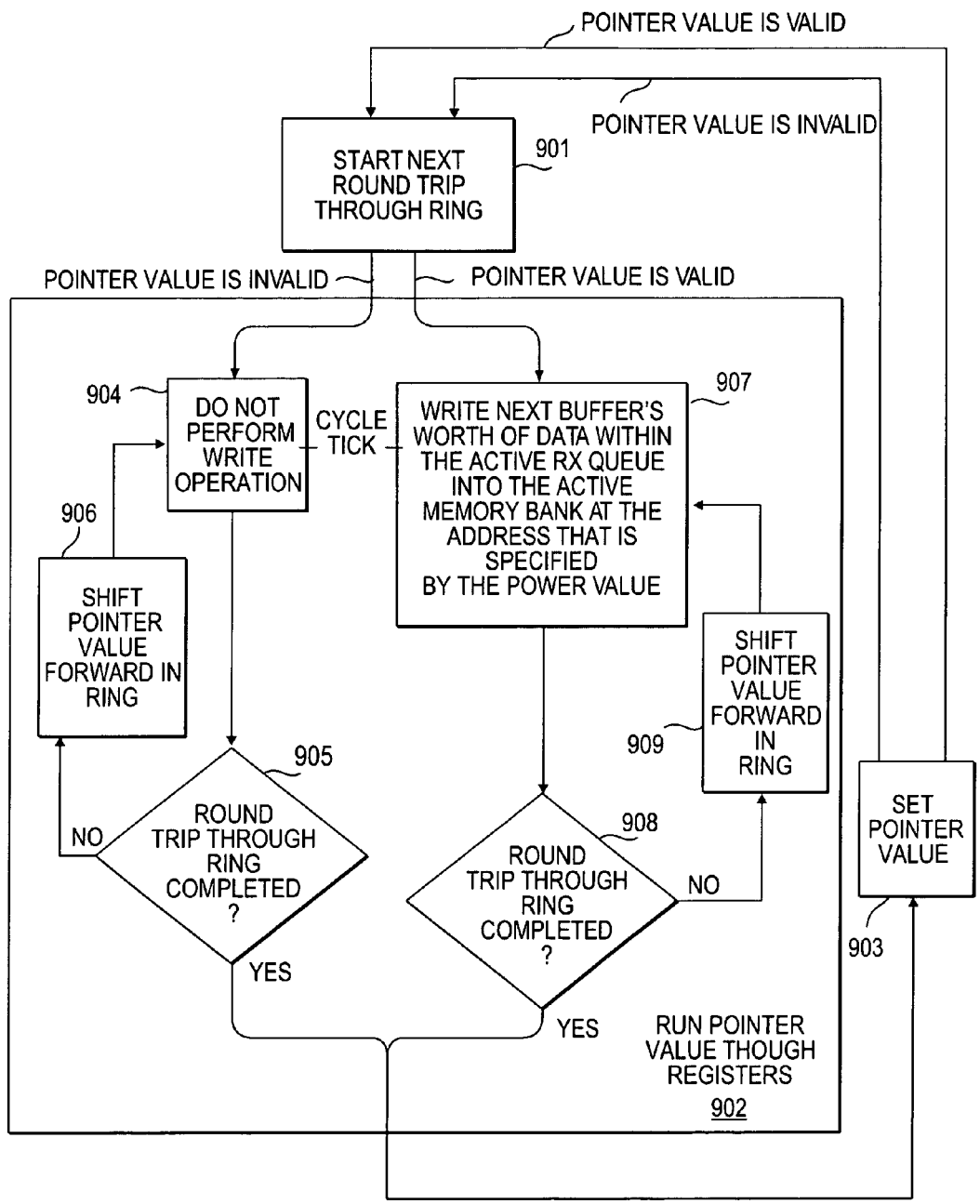
Figure 9B:
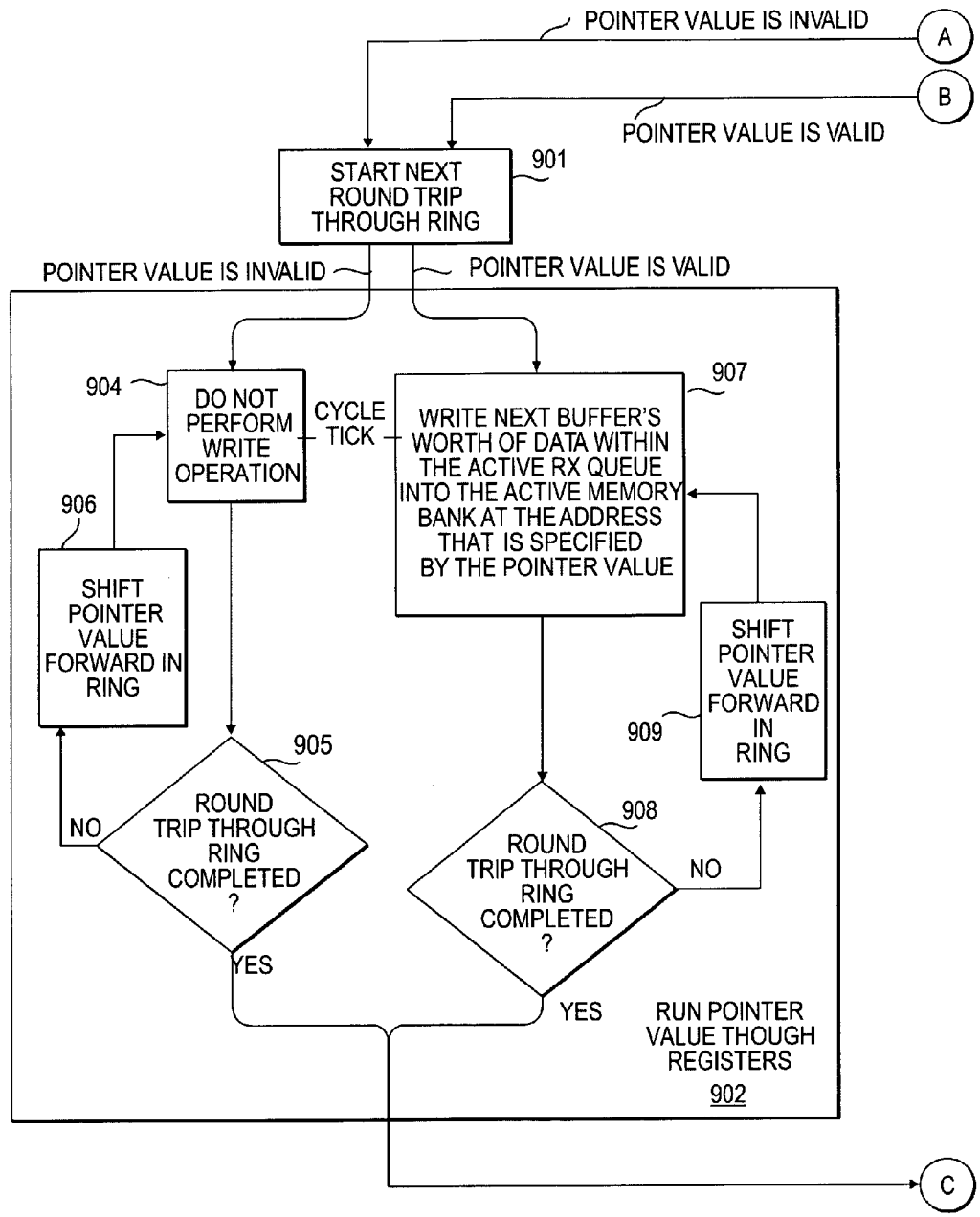
Figure 9B:
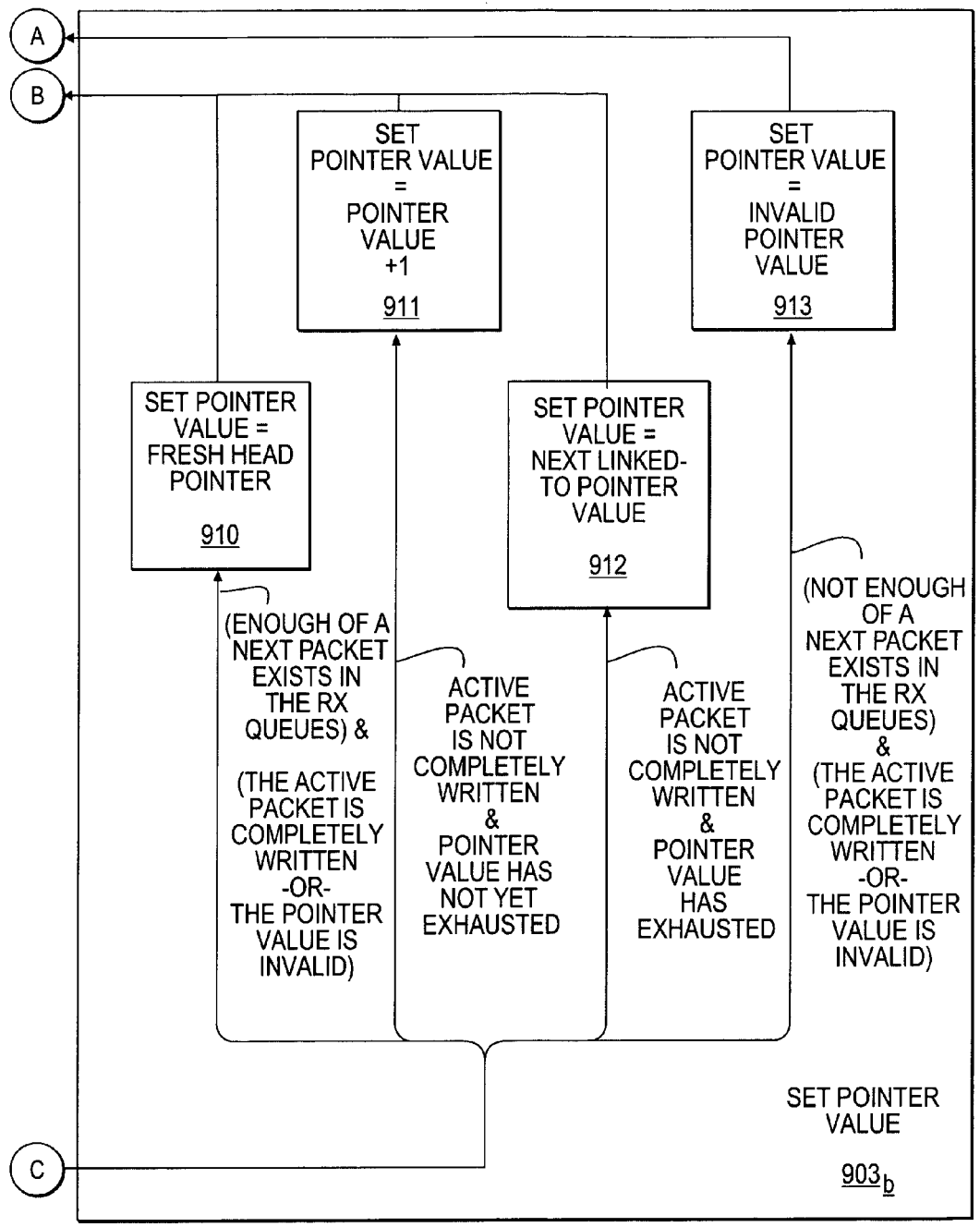

FIG. 6*a* shows a first exemplary depiction of the register contents of a scheduler having a register ring architecture such as the scheduler of FIG. 5;

FIG. 6*b* shows a first exemplary depiction of the register contents of a write hub, in a low speed mode, having a register ring architecture such as the write hub observed in FIG. 7;

FIG. 6*c* shows a second exemplary depiction of the register contents of a write hub, in a low speed mode, having a register ring architecture such as the write hub observed in FIG. 7;

FIG. 6*d* shows an exemplary depiction of the register contents of a write hub, in a high speed mode, having a register ring architecture such as the write hub observed in FIG. 7;

FIG. 7 shows an embodiment of a write hub having a register ring architecture that is capable of operating in either a high speed mode or low speed mode;

FIG. 8*a* shows an embodiment of a low speed mode methodology for a write hub having a register ring architecture such as the write hub observed in FIG. 7;

FIG. 8*b* shows a more detailed embodiment of a low speed mode methodology for a write hub having a register ring architecture such as the write hub observed in FIG. 7;

FIG. 9*a* shows a high level embodiment of a high speed mode methodology for a write hub having a register ring architecture such as the write hub observed in FIG. 7;

FIG. 9*b* shows a more detailed embodiment of a high speed mode methodology for a write hub having a register ring architecture such as the write hub observed in FIG. 7;

DESCRIPTION

Overview of Infiniband Switch Embodiment

Figure 1:
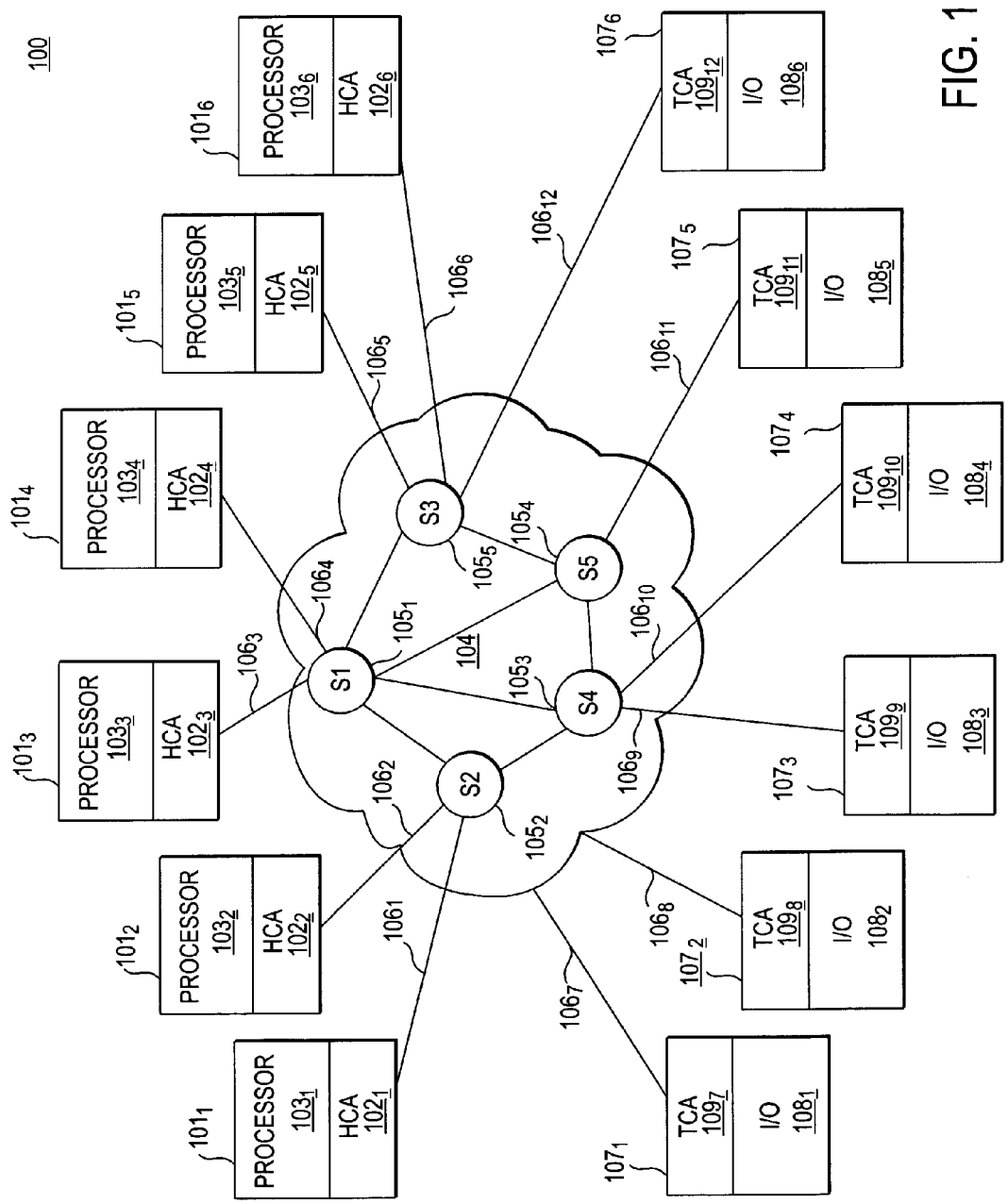
FIG. 1 shows an example of an Infiniband network.
Figure 2:
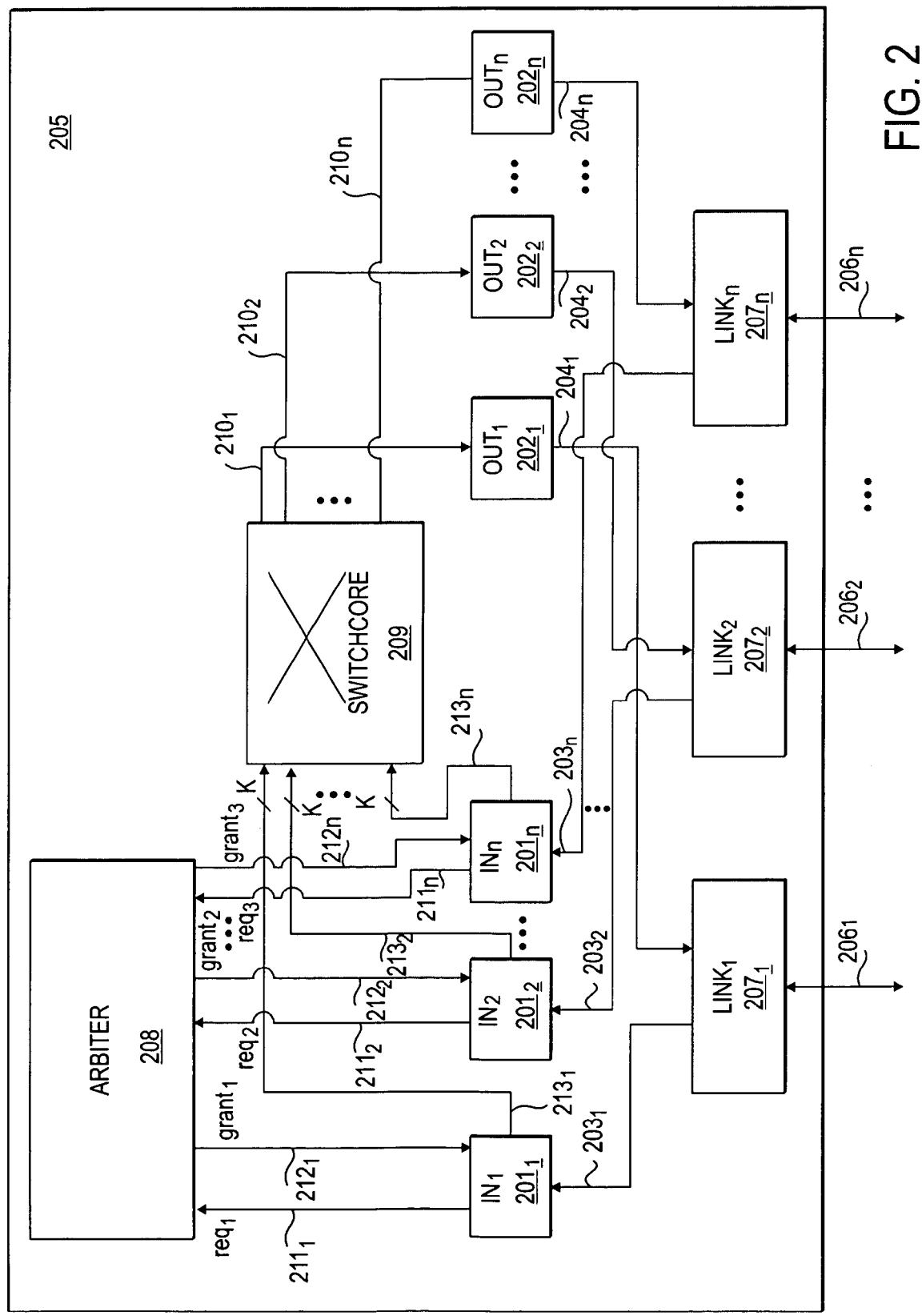
FIG. 2 shows an example of a switching node that may be used within an Infiniband network.

FIG. 2 shows an embodiment of a design 205 for a switching node. That is, switching node 205 may be viewed as an "in-depth" perspective of any of the switching nodes 105$_1$ through 105$_5$ shown in FIG. 1. According to the switch design of FIG. 2, a plurality of links 206$_1$ through 206$_n$ are coupled to the switch 205. A link is a networking line that propagates information from switch to switch within the network (or acts as an access link that allows devices outside the network to send/receive information to/from the network). Examples include copper or fiber optic cabling.

In the Infiniband scheme, currently, links are characterized as having a "4×" speed or a "1×" speed. Currently, a 1× speed link has as a 2.5 Gbps link rate (2 Gbps data rate) and is implemented as a single link that is operated at this speed. A 4× speed link may be implemented as the combination of four 1× speed links that operate in unison together (e.g., four 1× speed links collectively transport different pieces of the same packet). As such, the total speed of the 4× link is a 10 Gbps link rate (8 Gbps data rate). It is important to note, however, that as the Infiniband standard evolves, other link speeds and topologies are possible (e.g., a 4× link constructed from a single link that operates at a 10 Gbps link rate). As seen in FIG. 2, each link 206$_1$ through 206$_n$ has an associated link interface 207$_1$ through 207$_n$.

A link interface is responsible for launching packets onto a link and receiving packets from a link. Thus, for example, link interface 207$_1$ launches packets onto link 206$_1$ and receives packets from link 206$_1$. Each link interfaces 207$_1$ through 207$_n$ also has an associated input port (that accepts incoming packets) and output port (that provides output packets). That is, for example, link interface 207$_1$ sends incoming packets that have arrived from link 206$_1$ to input port 201$_1$; and, output port 202$_1$ provides outgoing packets to link interface 207$_1$ for transmission over link 206$_1$. Alternate embodiments may deviate from the 1:1:1 link:link interface:port ratio just described above (e.g., 1:1:2, 1:1:3, etc.,).

The general traffic flow for an incoming packet is to flow firstly from its link interface to its input port. Then, the packet flows from its input port to a switching core 208 (which can be constructed with a crossbar switching architecture (as suggested by FIG. 2) or other types of switching architectures). The switching core 208 is a unit that switches the incoming packet from its input port to its appropriate output port; and, in so doing, effectively converts the incoming packet to an outgoing packet. For example, if an incoming packet from link 206$_1$ is to be emitted as an outgoing packet on link 206$_n$, the switching core 208 will "switch" the packet from switching core input 213$_1$ to switching core output 210$_n$.

As such, the packet will be directed from input port 201$_1$ to output port 202$_n$ which effectively converts the packet from an input packet to an output packet. Note that in the switch design 205 of FIG. 2, each input port 201$_1$ through 201$_n$ has a plurality ("k") of output lines. That is, each input port enjoys multiple inputs to the switching core 208 In an embodiment, k=3. As such, each input port 201$_1$ through 201$_n$ is capable of simultaneously sending 3 different packets to the switching core 209; and, for a switch 205 where n=8, the switching core 209 corresponds to a 24×8 (input/output) switch.

The timing as to when an incoming packet is permitted to be switched by the switching core 208 is controlled by the arbiter 208. In an embodiment, for each incoming packet, a request data structure is issued by the corresponding input port to the arbiter 208. For example, if link interface 207$_1$ sends a packet to input port 201$_1$, input port 201$_1$ issues a request data structure along request interface 211$_1$ to the arbiter 208. As a request data structure is issued for each incoming packet, the arbiter 208 effectively collects these requests and is able to develop an understanding of the overall offered load being presented to switch 205.

Arbiter 208, which may be viewed as the central intelligence of the switch 205, "decides" when a particular request is to be favorably responded to. When such time arrives, a grant is directed from the arbiter 208 to the input port that issued the request. For example, for the aforementioned packet in which a request data structure was issued by input port $201_1$, the arbiter 208 will issue a grant along interface $212_1$ to input port $201_1$ at a moment in time that is consistent with a moment or region of time that the arbiter 208 has decided is suitable for switching the packet through the switch 205.

In an embodiment, each of the input ports $201_1$ through $201_n$ are configured to have some sort of queuing or blocking so that one or more incoming packets can "wait" until the arbiter 208 decides the time is appropriate for each of their individual releases to the switching core 209. The arbiter 208 typically has designed into its intelligence the ability to determine when a grant should be provided to each incoming packet (that has had a request data structure issued to the arbiter 208 by its input port) based upon a number of factors.

The factors may include: 1) whether or not sufficient bandwidth resources currently exist at the output port and output link to which each packet is directed; 2) whether or not sufficient bandwidth resources currently exist at the switching core 209 to handle the switching of a next packet; 3) the relative priority of each packet (e.g., as based upon the source/destination of each packet and/or the packet type of each packet). The arbiter 208, depending on its particular design, may also possess functionality that determines the appropriate output port for each incoming packet (e.g., based upon the destination address embedded within each packet's header information).

As such, each request data structure that is issued from an input port to the arbiter 208 may be embedded with (or otherwise include) various specific information about its corresponding incoming packet. For example, in one embodiment, each request includes: 1) the size of the packet; 2) information that characterizes the packet (e.g., whether or not the packet is a "VL15" packet, which partition the packet belongs to, etc.); 3) the service level (SL) of the packet (which, as is known in the art, is an Infiniband packet header parameter that indicates the priority level of the packet); 4) the destination address of the packet;, etc. Thus, in a sense, as the arbiter 208 makes bandwidth allocation decisions that are based upon a number of factors, such factors may be embedded with each request data structure as they pertain to its corresponding incoming packet. A more detailed discussion of various arbiter embodiments may be found in U.S. patent application Ser. No. 09/949,367, filed on Sep. 7, 2001 and entitled "METHOD AND SYSTEM TO MANAGE RESOURCE REQUESTS UTILIZING LINK-LIST QUEUES WITHIN AN ARBITER ASSOCIATED WITH AN INTERCONNECT DEVICE".

Figure 3:
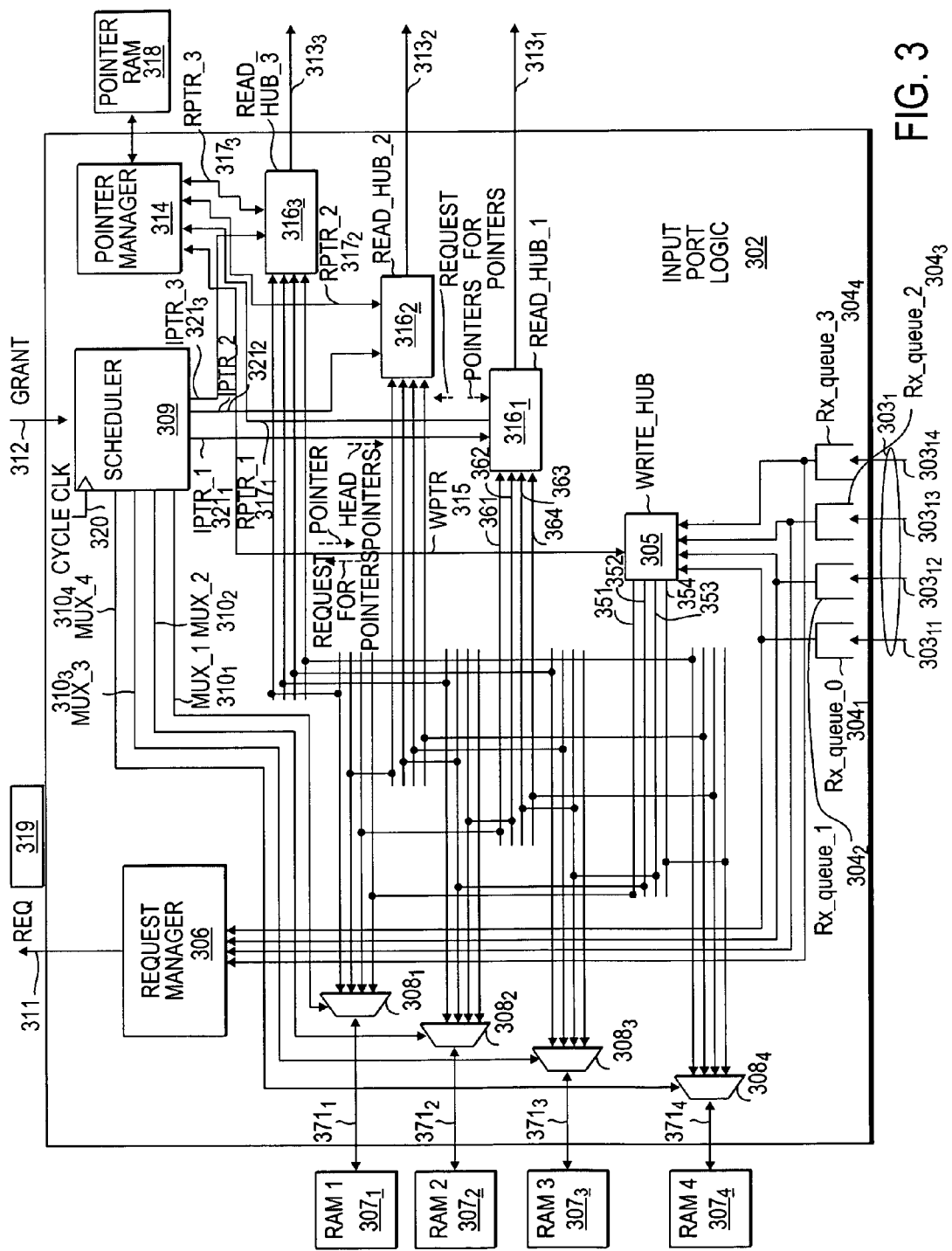
FIG. 3 shows an example of a design for an input port that may be used within the switching node observed in FIG. 2.

Before progressing to FIG. 3, as is consistent with the Infiniband approach, note that in an embodiment each link can support up to 16 different Virtual Lanes (VLs) in the same direction (i.e., input or output). VLs effectively "break down" the traffic being transported by a link so that it can be viewed as a collection of unique traffic flows each having their own specific amount of bandwidth consumption. Typically, each VL on a link is given a number of "credits" where a credit corresponds to an amount of data allowed to be carried by the VL to which the credit is assigned. Other VL schemes besides 16 VLs per link may be developed (e.g., as a proprietary solution; or, as the Infiniband standard evolves in the future).

A link source node is typically allowed to transmit packets along a particular VL until the credit count for the VL is completely consumed. That is, each transmission of a packet along a particular VL decrements the credit count at the source node for that VL; and, if the credit count is less than the size of the next packet to be sent on that VL, no more transmissions are allowed on the link by the link source node for that VL. After a packet has been received by a link receiving node and switched through the switch core 209, it is re-transmitted by another outgoing link (and therefore another VL). In response, the link receiving node sends the credit count that was consumed by the packet back to the link source node so that the link source node's credit count for the VL can be refreshed (which permits the sending of a subsequent packet).

Overview of Input Port Operation

FIG. 3 shows an embodiment 301 of an input port that may be used for any of the input ports $201_1$ though $201_n$ observed in FIG. 2. In an embodiment, the link interface that feeds the input $303_1$ performs bit recovery and byte synchronization from the incoming data stream(s) being received on the input link(s) and the request manager 306 performs packet synchronization. That is, is a sense, the link interfaces have no "packet awareness" and merely determine the individual bytes of data that they are receiving. These bytes of data are then passed along the port input $303_1$ to the request manager 306; and, the request manager 306 determines where packets start and end from the stream of information that it receives from the link interface.

In various embodiments, the link interface may be designed to handle different link speeds. As such, the input port 301 should also be suitably designed to handle different link speeds. For example, a simple link interface may be designed to handle either one high speed link (e.g., one 4× link) or one low speed link (e.g., one 1× link). A more sophisticated link interface may be designed to handle either a high speed link or one or more low speed links. For example, as just one possible implementation, a link interface may be designed to be configured into either a high speed mode (e.g., that supports one 4× speed link); or, a low speed mode that supports individual lower speed links (e.g., a plurality of different 1× speed links).

An embodiment of the particular input port embodiment 301 observed in FIG. 3 can handle a link interface that is designed to provide either one 4× speed link (in its high speed mode) or up to four separate 1× speed links (in its low speed mode). It is to be emphasized, however, that an input port capable of properly handling traffic from link interfaces having different configuration characteristics that defined just above may be readily designed in light of the underlying operational principles of the input port described below. As such, unless specifically recited, the following claims should not be automatically construed as being limited to covering only those implementations designed to handle a link interface that is designed to provide either one 4× speed link (in its high speed mode) or up to four separate 1× speed links (in its low speed mode). Better said, because the description that follows describes basic underlying concepts for handling a high speed traffic stream or a plurality of different lower speed traffic streams, its application can be extended to different link speeds (e.g., other than 1×, 4×, etc.), different high speed vs. low speed configuration combinations (e.g., other than 4× vs. 1×), and/or different numbers of links to be handled (e.g., other than one high speed link, four low speed links, etc.). Furthermore, consistent with this perspective, the discussion provided above can be applied to proprietary or future Infiniband applications; or even, applications that are not directed to the Infiniband standard.

For simplicity, the following discussion is mostly directed to input port embodiment 301 that is configured to handle a link interface that is designed to provide either one 4× speed link (in its high speed mode which may also be referred to as the "4× mode") or up to four separate 1× speed links (in its low speed mode which may also be referred to as the "1× mode"). Here, note that four separate inputs $303_{11}$, $303_{12}$, $303_{13}$, $303_{14}$, are associated with the input $303_1$ to the input port logic 302. As these inputs are provided by the underlying link interface, in a first "high speed" mode (the 4× mode) all four of the separate inputs $303_{11}$, $303_{12}$, $303_{13}$, $303_{14}$ are used together to provide the data from a single 4× speed link; and, in "low speed" mode (the 1× mode), each of the separate inputs $303_{11}$, $303_{12}$, $303_{13}$, $303_{14}$ is responsible for providing the flow of data from its own corresponding 1× speed link.

That is, in high speed mode consecutive groups of received data from the high speed link are distributed in a round robin sequence across the four inputs (e.g., such that a first group of received data is provided at input $303_{11}$, a second group of information is provided at input $303_{12}$, a third group of information is provided at input $303_{13}$, and a fourth group of information is provided at input $303_{14}$; where, the first through fourth groups of information provide a larger group of received information in its proper sequence and the same can be said for following groups of information. In low speed mode, each of the four inputs corresponds to its own unique 1× link (e.g., data from a first 1× link is received at input $303_{11}$, data from a second 1× link is received at input $303_{12}$, data from a third 1× link is received at input $303_{13}$, and data from a fourth 1× link is received at input $303_{14}$). Note that "up to" four 1× links may be active in low speed mode at one time. Thus, less than four 1× links (e.g., three 1× links; or two 1× links, or one 1× link) may actually be operating when in low speed mode. The number of links in use depends upon the configuration of the overall switch.

In a further embodiment, each input corresponds to a byte wide interface. As such, a byte of information is received at once along input $303_{11}$, a byte of information is received at once along input $303_{12}$, a byte of information is received at once along input $303_{13}$; and, a byte of information is received at once along input $303_{14}$. As such, in 4× mode, the overall input $303_1$ can be viewed as a 32 bit wide interface that provides 32 consecutive bits of received data from the 4× link; while, in 1× mode, the overall input $303_1$ can be viewed as providing four separate byte-wide interfaces. Again, less than four 1× links may be active during low speed mode. Note that in alternate embodiments the bitwidth of each input may be different than 8 bits (e.g., 10 bits, 16 bits, etc.).

Figure 4:
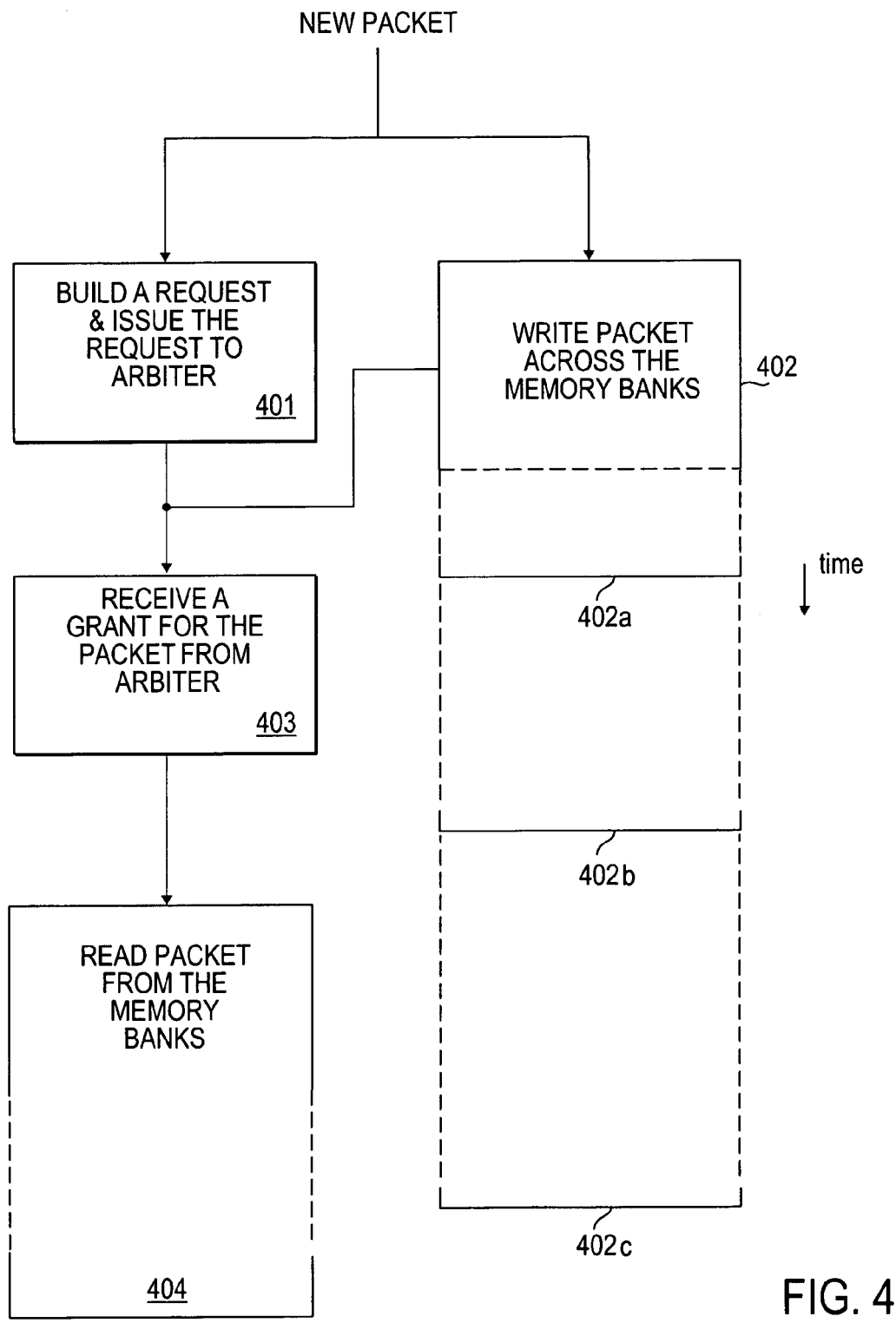
FIG. 4 shows a methodology for processing a packet that may be performed by the input port of FIG. 2.

Note that, if the link interface is configured in 4× mode, a single stream of packets will be provided by the overall input $303_1$; while, in 1× mode, up to four distinct streams of packets will be provided by the overall input $303_1$ (i.e., one distinct stream for each of inputs $303_{11}$, $303_{12}$, $303_{13}$, $303_{14}$). An important part of the input port 301 design is the ability to identify and separately manage the storage and retrieval of each packet whether in 4× mode or in 1× mode. FIG. 4, when viewed together with FIG. 3, helps to describe, at a high level, an embodiment of an overall processing flow that may be applied to the packets that are managed by the input port 301. According to the methodology of FIG. 4, for each newly arriving packet: 1) a request data structure 319 is built by the request manager 306 and issued 401 to the arbiter at output 311 (so as to effectively request the permission of the arbiter to send the packet to the switch core as described with respect to FIG. 2); and, 2) the newly arriving packet is written 402 across a plurality of memory banks $307_1$ through $307_4$ by a write hub unit 305 so that it can be temporarily stored while the arbiter consumes time deciding when it is appropriate to send the packet to the switch core. A write hub is collection of circuitry used to write packets into the memory banks. Various write hub approaches are discussed in more detail below.

Upon the receipt of a grant from the arbiter at input 312 (which signifies permission to forward the packet from the memory banks $307_1$ through $307_4$ has been obtained from the arbiter), a scheduler 309 helps to organize the reading of the packet from the memory banks $307_1$ through $307_4$. Here, a particular read hub unit (e.g., one of read hub units $316_1$ through $316_3$) is notified of its responsibility to read 404 the packet from the memory banks $307_1$ through $307_4$; and, the packet's information is read from the memory banks $307_1$ through $307_4$ by the notified read hub and directed to the switch core along the appropriate input port output (e.g., output $313_1$ for read hub $316_1$, output $313_2$ for read hub $316_2$, output $313_3$ for read hub $316_3$). Here, from the discussion of FIG. 2, recall that each input port may have "k" outputs to the switch core 209. Further recalling that in one embodiment k=3, note that the embodiment of FIG. 3 corresponds to such an approach.

Before commencing with in-depth discussions of various architectural approaches that may be used for each of the write hub unit 305, the scheduler 309, the read hub units $316_1$ through $316_3$, and the pointer manager 314; a brief discussion of the operation of the request manager 306 and the function of link-lists will be provided. Noting that the request manager 306 is able to observe the packet streams being sent from the link interface (by being coupled to the output of each of Rx queues $304_1$ through $304_4$), the request manager 306 is configured, for each stream of packets received by the input port 301, to determine: 1) where packets start and end; 2) the VL the packet belongs to; and 3) the size of the packet. These determinations may be made by analyzing each input packet's header information. In various embodiments, this information may be used to help build the request data structure 319 that is sent to the arbiter at along output 311.

Based upon the size of the packet and the VL to which the packet belongs, the request manager 306 may also be configured to check the credit count for the packet's VL (e.g., from VL credit register space built into the request manager 306 which is not shown in FIG. 3 for simplicity) to see if sufficient credits existed on the link to receive the packet. That is, recalling the discussion provided toward the end of the preceding section, VL credits are "kept track of" so that proper link operation can be verified. Specifically, VL credit registers (which are associated with the request manager 306 and are not shown in FIG. 3 for simplicity) effectively keep a record of the credits that are available to each VL (or a subset thereof). For each packet that arrives to the input port 301, the request manager decrements the credit count of the VL that carried the packet. Upon the packet's being read out memory (in response to a grant being received from the arbiter), the credit count is refreshed.

In various embodiments, the Infiniband approach has allocated the $0^{th}$ through $14^{th}$ VLs for typical data transportation. As such, only 15 registers (or register fields) are implemented within the request manager 306 (one register/register field for each of VLs 0 through 14) for each separate packet stream the request manager 306 may have to monitor (in this case, four). The 15th VL (upon which "VL15 packets" flow) is reserved for network maintenance/control information. As VL15 packets are considered "high priority" packets, in an embodiment, no flow control is performed and credit counts are not kept track of for a link's VL15 virtual lane. As such, in an embodiment, the request manager 306 is designed to not only recognize the arrival of a VL15 packet (e.g., from the packet's header information), but also does not refer to the credit count related register space for any VL15 packet. Instead, if a second VL15 packet arrives to the port 301 before a first VL15 packet leaves the port 301, the second packet is automatically dropped. In an alternative embodiment, a fixed number of VL15 packets can be queued before VL15 packets begin to be dropped.

After a packet begins to be observed by the request manager 306 (and the credit count is deemed sufficient for the packet), the request manager 322, then scans the packet's header information and builds a request data structure 319 for the packet. The request data structure 319 is then forwarded to the arbiter (along the request interface 311). Recall from the discussion above with respect to FIG. 2 that a request data structure may be configured to include: 1) the size of the packet; 2) information that characterizes packet; 2) the service level (SL) of the packet; 3) the destination address of the packet, etc. Each of these may be extracted from the header of the packet. In at least one embodiment, each request data structure also includes: 1) an indication as to which one of the four memory banks $307_1$ through $307_4$ where a first piece of the corresponding packet is stored; and 2) the corresponding address (referred to as a "head pointer") for that memory where the first piece can be found. Both the indication as to which memory bank and the head pointer are then included in the grant for the packet (which is received from the arbiter at grant interface 312), so that the read hub responsible for reading the packet understands where the next packet is to be found. The read hub responsible for reading the packet uses the head pointer (and the memory bank indication) to begin reading the packet from correct memory bank at the proper address.

Here, note that part of the function of the write hub is to organize a received packet into fixed size "chunks" or pieces of data. These chunks or pieces may be referred to as a "buffer" or a "buffer's worth of data". The write hub 305 is responsible for writing a buffer across the memory banks $307_1$ through $307_4$. Here, one pointer value is consumed per buffer. That is, recalling the discussion from just above, a head pointer is used to identify a memory address where the first buffer of a packet is stored. For each following buffer that is formed from the packet, a new pointer is used to point to a memory region across the memory banks $307_1$ through $307_4$ where the buffer can be stored. Here, pointers are retrieved from the pointer manager 314. The pointer manager 314 is responsible for maintaining a "link-list" for the packet. A link-list is a record of the pointer values used to store a packet.

Thus, after a packet has been completely stored across the memory banks $307_1$ through $307_4$ and a grant has been received from the arbiter for that packet, the pointer values stored in the link list may be referred to by a read hub to read the packet from memory at the correct addresses. Note that, perhaps depending on the size of the packet, if a grant for a packet is received shortly after a request was sent to the arbiter for that packet, the earlier arriving buffers of a packet may be read from the memory banks $307_1$ through $307_4$ and forwarded to the switch core while later portions of the packet are still arriving and being written into the memory banks $307_1$ through $307_4$. The term "cut-through" is used to describe this processing sequence where a packet is simultaneously being read from and written to memory as described just above. FIG. 4 shows the possibility of cut-through by border 402c (which shows the writing 402 of a packet may overlap in time with the reading 404 of a packet). Border 402a corresponds to a situation where a packet is completely written before a grant is received 403 from the arbiter; and, border 402b corresponds to a situation where a packet is completely written after a grant has been received 403 but before the packet begins to be read 404 from memory).

Write Operation

Referring to FIG. 3, note that the particular embodiment shown therein possesses one write hub 305 and three read hubs $316_1$ through $316_3$. As all four of these hubs 305, $316_1$ through $316_3$ are capable of using a different one of the memory banks $307_1$ through $307_4$ within the same cycle of operation; and, as each packet is stored across each of the different memory banks $316_1$ through $316_3$, some form of organizing presence is needed to prevent the different hubs from interfering with each other's needs of the various memory banks $316_1$ through $316_3$. In the particular embodiment of FIG. 3, a scheduler unit 309 is used to control the channel select input for each of a plurality of multiplexers $308_1$ through $308_4$ such that each hub 305, $316_1$ through $316_3$ (while moving the data of a packet) gains access to the memory banks $307_1$ through $307_4$ via a round robin sequence; where, after a first memory bank (e.g., memory bank $307_1$) is accessed during a first cycle of operation, a second "next" memory bank (e.g., memory bank $307_2$) is accessed during a "next" second cycle of operation.

By identifying the first memory bank (e.g., memory bank $307_1$) as the "next" memory bank relative to the last memory bank (e.g., memory bank $307_4$) in the round robin scheme, from the perspective of one of the hubs, a different memory bank is "rotated" to the hub for its use for each cycle of operation. Over time, the hub will be provided cyclical access to all of the memory banks (e.g., BANK1, BANK2, BANK3, BANK4, BANK1, BANK2, BANK3, BANK4, etc.). By allowing each hub to have access to a different memory bank during any same cycle of operation, all four hubs can simultaneously enjoy rotated access to each of the memory banks. Here, the scheduler unit 309 in the embodiment of FIG. 3 is responsible for controlling the multiplexers $308_1$ through $308_4$ in a fashion that is consistent with the scheme described just above. That is, under full loading conditions, not only is each multiplexer configured to give memory access to a different hub during any same cycle of operation (e.g., during a first cycle: 1) multiplexer $308_1$ gives access to read hub 3 $316_3$; 2) multiplexer $308_2$ gives access to read hub 2 $316_2$; 3) multiplexer $308_3$ gives access to read hub 1 $316_1$; and, 4) multiplexer $308_4$ gives access to the write hub 305); but also, each multiplexer is configured to select hubs (giving them access to its corresponding memory) in round robin fashion. In the embodiment of FIG. 3, the scheduler 309 is responsible for providing the correct channel select values across the multiplexer channel select lines $310_1$ through $310_4$ to realize this scheme.

FIG. 5 shows an embodiment of a scheduler unit 509 that can be used to implement the scheduler unit 309 of FIG. 3. The read demand logic 522 and associated circuitry 520, 521, $523_1$ through $523_3$ comes into play for the reading of packets from the memory banks. Referring to the scheduler unit embodiment 509 of FIG. 5, note that ring of registers $526_1$ through $526_4$ is observed. A ring of registers (which may also be referred to as a "register ring", a "register ring architecture" and the like, etc.) is an arrangement of registers where: 1) the contents of each register can be shifted to "next" register in the ring; and, 2) the continuous shifting of the contents through registers causes the contents to circulate through the registers. The circulation is caused by a feedback path that flows from the last register to the first register in the ring (e.g., as observed from by the feedback path that flows from register $526_4$, through multiplexer $525_1$, and into register $526_1$). Here, the circulation of the register contents is used to implement the round robin scheduling scheme that was just discussed above.

Insight into how the register ring can be used to implement a round robin scheduling scheme can be gleaned by referring to both FIGS. 5 and 6a. FIG. 6a shows the circular rotation of the register contents over time. The columns of the chart observed in FIG. 6a correspond to a consecutive string of operational cycles that the time of operation of the input port is organized into. The rows of the chart observed in FIG. 6a correspond to the contents of the registers $526_1$ through $526_4$ (or the outputs MUX1 $510_1$ through MUX4 $510_4$ that are respectively derived from them). The rows have been labeled according to the memory bank that is accessed by way of the contents held within the register that each row corresponds to. That is, referring briefly to FIGS. 5 and 3, register $526_1$ controls access to the first memory bank (BANK 1) $307_1$, register $526_2$ controls access to the second memory bank (BANK 2) $307_2$, register $526_3$ controls access to the third memory bank (BANK 3) $307_3$, and register $526_4$ controls access to the fourth memory bank (BANK 4) $307_4$.

The fact that the registers control access to the memory banks as described above can be recognized by realizing that the output nodes MUX1 $510_1$ through MUX4 $510_4$ of the scheduler 509 of FIG. 5 corresponds to the output nodes MUX1 $310_1$ through MUX4 $310_4$ of the scheduler 309 of FIG. 3. As such, in the implementation of FIG. 5, the contents of register $526_1$ correspond to the logical value that is applied to the channel select input $310_1$ of the first multiplexer $308_1$; the contents of register $526_2$ correspond to the logical value that is applied to the channel select input $310_2$ of the second multiplexer $308_2$, etc. Referring now to FIGS. 3 and 6a, note that each of the four multiplexers $308_1$ through $308_4$ have the same input channel design. That is, each of the four multiplexers $308_1$ through $308_4$ have: 1) their first input channel coupled to read hub_3 $316_3$; 2) their second input channel coupled to read hub_2 $316_2$; 3) their third input channel coupled to read hub_1 $316_1$; and, 4) their fourth input channel coupled to the write hub 305.

As such, a specific channel select value will have the same effect regardless as to which multiplexer's channel select input receives it. That is, for example, if a value of "11" is placed upon the channel select input of any of the multiplexers $308_1$ through $308_4$ causes the multiplexer to select its fourth input; then, rotating a value of "11" across the channel select lines $310_1$ through $310_4$ will cause the write hub to enjoy round robin access to the memory banks as described above. Referring then to FIGS. 3, 5 and 6a and continuing with this example, note that if the logical value for "W" corresponds to "11"; then, FIG. 6a accurately represents how the channel select value for the selecting of the write hub 305 can be rotated across the channel select lines $310_1$ through $310_4$ (so as to provide round robin access to the memory banks $307_1$ through $307_4$ for the write hub 305) by rotating the "W" value forward in the register ring according to the register sequence $526_1$, $526_2$, $526_3$, $526_4$, $526_1$, $526_2$, . . . etc. where one shift of the "W" value occurs per cycle.

FIG. 7 shows a design embodiment for a write hub 705 that may be used to implement the write hub 305 that is observed in FIG. 3. According to the design approach of FIG. 7, a register ring architecture is used to control the address values that are applied to the memory banks during the writing of information into the memory banks. Here, pointer values are received for each buffers worth of information that is to be written into memory. A pointer value (and its derivatives as described in more detail below) is inserted into the ring and circulates through the ring until the information to be stored with the pointer value has been written into the memory banks. After the pointer value has been exhausted, it is removed from the ring (e.g., so that it can be replaced by a "next" pointer value so that an incoming packet can continue to be written). A more detailed explanation of the writing process for both a low speed mode and a high speed mode are discussed immediately below with respect to FIGS. 8a,b and 9.

a. Low Speed Mode Write Operation

FIGS. 8a and 8b correspond to methodologies that may be used to implement a low speed mode of operation (noting that the methodology of FIG. 8b can be viewed as an embodiment of a more detailed implementation of the methodology of FIG. 8a). Here, according to at least one embodiment, the low speed mode of operation corresponds to a 1× Infiniband speed. Furthermore, as the write hub embodiment 705 of FIG. 7 is capable of operating in either a high speed mode or a low speed mode, the "extra" bandwidth associated with handling the stream of packets from only one low speed link can be used to handle the streams of packets from multiple low speed links. For example, according to one approach, while in low speed mode, the write hub is able to separately manage four different 1× speed links. As an example, the ability of the write hub 705 to separately manage the writing of the streams of packets that are received from four separate 1× speed links will be described with respect to FIGS. 6b, 6c, 7, 8a and 8b.

Upon the arrival of a packet, the write hub will eventually receive (at the WPTR interface 715) a fresh "head" pointer that defines the memory address where the packet should first begin to be written into the memory banks. Note that arriving packets (or segments thereof) are temporarily enqueued within the Rx queue structure 703 observed in FIG. 7 (which also corresponds to the Rx queue structure 203 observed in FIG. 3). Referring briefly back to FIG. 3, note that the initial directive to send a fresh head pointer to the write hub 305 may be a signal, command or other communicative technique that exists between the request manager 306 and the pointer manager 314. That is, for example, upon recognition of a newly arriving packet, the request manager 306 may send some form of communication to the pointer manager 314 that the pointer manager interprets as a command to send a fresh head pointer to the write hub 305. For simplicity, such communicative capabilities are not shown in FIG. 3.

In a further embodiment, during the low speed mode, the write hub 705 also receives, for each fresh head pointer that it receives, some indication as to which Rx queue is to be "looked to" as having the portions of the packet that the fresh head pointer was sent in relation to. In the low speed mode, each of the Rx queues $703_1$ through $703_4$ are reserved for enqueueing pieces of packets from a particular low speed stream of traffic (e.g., Rx queue $703_1$ enqueues pieces of packets from a first stream, Rx queue $703_2$ enqueues pieces of packets from a second stream, etc.). That is, as the write hub 705 can handle four separate streams of packets in low speed mode, there should exist some technique for identifying which stream is to have its packet written into memory for a given fresh head pointer.

Here, receiving the identity of a particular Rx queue for each fresh head pointer that is received accomplishes this goal. In an embodiment, the identity of the implicated Rx queue is tagged along with the fresh head pointer so that the fresh head pointer and the Rx queue identification can be viewed as separate pieces of the same data structure. In this case, note that the identity of the implicated Rx queue can be sent to the pointer manager 314 from the request manager 306 so that the pointer manager 314 can form a data structure having both the Rx queue identification and the fresh head pointer. In alternate embodiments, the queue identification can be received with a different signal or data structure than that with which the fresh head pointer is provided. Referring briefly back to FIG. 3, note that some form of mechanism for communicating the Rx queue identification from the request manager 306 to the write hub 305 may be constructed. For simplicity, again, no such communicative capabilities have been shown. Through similar techniques, the size of the packet may also be communicated to the write hub 305 (from the request manager 306) so that the write hub 305 can properly determine when to stop writing information within an identified Rx queue simply by counting the amount of information that has been written for a particular packet.

FIGS. 6b and 6c show two separate examples of the state of the write hub's register contents over the course of sixteen scheduler cycles observed in FIG. 6a. FIGS. 8a and 8b show methodologies that can be used to describe the operation observed in FIGS. 6b and 6c. FIG. 6b demonstrates an example of the processing involved with respect to a single low speed traffic stream (e.g., one 1× speed link). FIG. 6c relates to the processing involved in handling from one to four separate low speed traffic streams. Firstly, a brief high level discussion will be provided by reference to FIG. 8a; then, a more detailed discussion of a particular methodology flow will be provided that focuses on the methodology presented in FIG. 8b.

According to a low speed mode of operation, referring to FIGS. 3, 7 and 8a, a register ring (such as the ring of registers $713_1$ through $713_4$ observed in FIG. 7) is used to control the address values presented to each memory bank $703_1$ through $703_4$. That is, referring briefly to FIGS. 3 and 7, the contents of register $713_1$ (REG. 1) are used to provide a write address to memory bank $307_1$; the contents of register $713_2$ (REG. 2) are used to provide a write address to memory bank $307_2$; the contents of register $713_3$ (REG. 3) are used to provide a write address to memory bank $307_3$; and, the contents of register $713_4$ (REG. 4) are used to provide a write address to memory bank $307_4$.

The write hub 705 is configured to focus upon 851 each register in the ring at a rate of one register per cycle (such that, for a particular round trip through the ring, the answer to inquiry 853 is "no" until the last register in the ring has been focused upon). Here, a focused upon register is a register whose turn it is to generate a write address (noting that, as described in more detail below, a focused upon register may fail to generate a write address during its turn (e.g., if its contents include an invalid pointer).

If, during a cycle when a particular register is being focused upon, the write hub 705 also happens to be given access to the register's corresponding memory bank (and if the register's contents are deemed to be a valid write address), the write hub writes 852 a buffer's worth of data into the register's corresponding memory bank. After the last register in the ring has been focused upon (such that the answer to inquiry 853 is "yes"), the register contents are shifted 854 and the entire process repeats 850.

FIGS. 6b, 7 and 8b help demonstrate an embodiment of a more detailed approach. Starting at sequence 801 of FIG. 8b, the hub writing process, for the sake of convenience, can be viewed as starting at the first register 713, in the ring. In an embodiment, an "invalid" pointer value is used to indicate that no writing activity is to occur with a register that is presently storing an invalid pointer. As such, under no load conditions, invalid pointer values continuously circulate through the register ring until a first packet arrives. The methodology described with respect to FIG. 8b can be assumed to be starting from such a state just prior to the first cycle as observed in FIG. 6b.

Here, with register REG. 1 $713_1$ being the next register in the ring starting from the beginning of the loop, register REG. 1 $713_1$ becomes the first focused upon or "active" register 802 within the ring. Some further explanations are presently in order. As will become evident, the circuitry 701 responsible for controlling the register $713_1$ through $713_4$ contents steps through and focuses upon each register in the ring at a rate of one register per cycle. While a particular register is being focused upon, it may be referred to as the "active" register. When a register becomes the active register a set of implications arise. These implications include an "an active pointer value", an "active packet", an "active Rx queue" and an "active memory bank". The active pointer value is found within the contents of the active register and corresponds to an address value used for addressing the register's corresponding memory bank.

The "active memory bank" is the memory bank that is targeted by the active register (i.e., the register's corresponding memory bank as described above). The "active packet" is the packet for whom the "active pointer value" is dedicated or assigned to. That is, for example, recalling that a fresh head pointer is used to write the first buffer of a newly arriving packet, note that, in a sense, the fresh head pointer is assigned to a particular packet. For each subsequent pointer that is fetched in order to write a portion of the same packet, these pointers will also be similarly assigned to that same packet. The "active Rx queue" is similar to the "active packet" in that the active Rx queue is the Rx queue where the active packet is found. Here, recall from the discussion above that the active Rx queue can be identified commensurate with the reception of a fresh head pointer.

In the embodiment of FIG. 8b, pointer values may be deemed valid, exhausted or invalid. A valid pointer value is a pointer value that will be used to write a buffer's worth of information into a memory bank. An exhausted pointer value is a pointer value that has consumed all of its usefulness for the writing of the packet to which it is assigned; and, is in an indication that a "next" pointer value will need to be fetched from the pointer manager 314 in order to continue writing the packet. In an embodiment, four distinct write addresses evolve from each pointer value that is issued by the pointer manager 314. That is, a pointer value's pair of least significant bits are manipulated by the ring control logic 701 so that four separate write addresses can be constructed from each pointer value that is sent from the pointer manager 314. Other embodiments can evolve more or less than four addresses from a single pointer value sent by the pointer manager (e.g., two addresses if the least significant bit is modified; or, eight address if the least significant three bits are modified, etc.).

Continuing with an approach were four separate addresses evolve from a single pointer provided by the pointer manager, once four separate writes have been made, the pointer value is "exhausted" (because no further writes can be made from it) and a fresh pointer value has to be received from the pointer manager so that addresses sufficient for four more writes can be made. This operation is described once again in more detail below. An invalid pointer value may be marked with an extra bit within the register space that is used to signify that no write is take place. Note that, under no load conditions (i.e., no packets are waiting to be completely written), no writing activity will take place into the memory banks $307_1$ through $307_4$. As such, registers $713_1$ through $713_4$ will circulate invalid pointer values to ensure that no writing activity takes place.

Recalling that the example of FIG. 6b can be assumed to starting from such a state, and recognizing that in the example of FIG. 6b the active register for the first cycle is register $713_1$, note that methodology of FIG. 8b leads to sequence 805 because the invalid pointer presently within register $713_1$ needs to be replaced with a fresh head pointer "P1" in order to commence the writing of the packet whose first buffer is waiting to be written. In a further embodiment, the activity of getting the fresh head pointer P1 to the write hub 705 is designed to take place while the first buffer's worth of information (for the packet for whom the fresh head pointer is being retrieved) is being collected within its appropriate Rx queue. As such, when the fresh head pointer is actually received by the ring control logic 701, all the ring control logic 701 needs to do is place it within the first available register. As the present example assumes the ring is full of invalid pointers at the start of cycle 1, the first available register will be the first active register which has also been assumed to register $713_1$.

The replacement of the invalid pointer with the valid pointer causes the fresh head pointer "P1" to be written into register $713_1$. Note that the register ring includes a first multiplexer $702_1$ whose output determines the contents of the first register $713_1$. Here, assuming the first buffer's worth of information is already collected within its Rx queue and is waiting to be written, the ring control logic 701 (which controls the channel select 710 input of multiplexer $702_1$ and has access to one 711 of the input channels), in order to implement sequence 805: 1) places the fresh head pointer value "P1." on the first multiplexer input channel 711; and, 2) manipulates the channel select input 710 so that the fresh head pointer value "P1" is written into the first register $713_1$. FIG. 6b starts from this state because a value of "P1" is observed for the REG. 1 register $713_1$ during Cycle 1. With the invalid pointer value having been replaced 805 with the valid head pointer value "P1", the methodology flows to sequence 810 (because the active pointer is now valid).

Sequence 810 indicates that a write only takes place if the active register has been given access to the active memory bank. From the discussion of FIG. 6a, recall that the scheduler unit 309 is responsible for determining during which cycles the write hub 305 will have access to a particular memory bank. This access, for each of the examples provided in FIGS. 6b and 6c, is shown in FIG. 6a. That is, the write hub 305 only has access to memory bank 1 $307_1$ during Cycles, 1, 5, 9, 13, etc; memory bank 2 $307_2$ during Cycles 2, 6, 10, 14, etc., etc. Exactly when the write hub has been given access to a particular memory bank has been indicated in FIGS. 6b and 6c through the use of shaded regions. That is, if a region is shaded in FIGS. 6b and 6c, the write hub has access to the memory bank during the cycle that the shaded region corresponds to. Note that the shaded regions of FIGS. 6b and 6c merely correspond to the scheduling properties of FIG. 6a being superimposed upon the write hub ring activity of FIGS. 6b and 6c.

As such, sequence 810 of FIG. 8b effectively tests whether or not the active register has been given access to its corresponding memory bank. If not, no write operation takes place 809 and the cycle becomes an empty write cycle (i.e., no writing to memory takes place); if so, the next buffer's worth of information is removed from the active Rx queue and written into the active memory bank. Referring to FIG. 6b, note that the active register REG 1 $713_1$ does have access to its corresponding memory bank (memory bank $307_1$) during the first cycle; and, as such, the next buffer of information is removed from the active Rx queue and is written at address P1 into memory bank $307_1$. Note that part of the writing process involves correctly manipulating the write hub multiplexer $705_1$ that feeds memory bank 1. Here, each write hub multiplexer $705_1$ through $705_4$ is used to properly couple its corresponding memory bank to proper active Rx queue.

In an embodiment, the contents of the active register (e.g., active register $713_1$ in the present case) not only include the pointer value (e.g., "P1") but also include an identification of the Rx queue for the packet to which the pointer value corresponds (i.e., the active Rx queue). Here, the contents of the register are used not only to present the address write value; but also, to control the channel select line of the corresponding write hub multiplexer. For example, with respect to the write that occurs in Cycle 1 of FIG. 6b, a first portion of the contents of register REG1 $713_1$ are directed along the memory bank 1 address bus ADDR_BANK_1 (which is drawn as an output from REG1 $713_1$) and a second portion of the contents of register REG1 $713_1$ are used to manipulate the channel select line of multiplexer $705_1$ (where no such output from the register has been drawn for simplicity); where, the second portion effectively corresponds to a value that identifies the proper Rx queue (e.g., "00" if Rx queue 1 $703_1$ is the Rx queue where the active packet is stored; "01" if Rx queue 2 $703_2$ is the Rx queue where the active packet is stored;, etc.).

Note that these first and second portions (i.e., pointer value and Rx queue identifier) may "ride" through the ring together with one another so that whenever a write is to actually take place from a particular register, the correct Rx queue can be immediately identified along with the address value to be used for the write. Note that write hub outputs 751 through 754 of FIG. 7 corresponds to write hub outputs 351 through 354 of FIG. 3. Here, a complete output for a memory write includes both the address and the data to be written. FIG. 3 is drawn simplistically to suggest that a single multiplexer 308, through $308_3$ is used to present both the data and the address to their respective memory banks $307_1$ through $307_4$. Although such a design is possible, it is also possible to use a pair of multiplexers for each memory bank $307_1$ through $307_4$—one multiplexer for propagating address signals and a second multiplexer for propagating data.

Continuing with the example then of FIG. 6b, after the first buffer has been written 811 into memory bank 1, the next active register (register REG2 $713_2$) is focused upon as the active register 802, 803 for the following cycle (Cycle 2). Here, because the packet can be assumed to be more than four buffer's worth of information, more than four writes are to be made to the memory banks in this example. As such, sequence 812 is avoided and the answer to inquiry 813 is "no" because the present round trip through the ring has not been completed. As a blank region in the chart of FIG. 6b corresponds to the placement of an invalid pointer in the corresponding register space, FIG. 6b indicates that the contents of the second register REG2 $713_2$ in the ring include an invalid pointer. Because the example of FIG. 6b corresponds to a situation where only one packet is being received and needs to be written into memory, there is no fresh head pointer for another packet. As such, during Cycle 2, the process flows through sequences 805 and 809. As such, no write activity takes place during Cycle 2. A similar flow of events occurs for each of Cycles 3 and 4 (which corresponds to registers REG 3 $713_3$ and REG4 $713_4$ being recognized as the active register, respectively).

In response to a decision to not write information during Cycle 4, however, the answer to inquiry 813 is "yes". That is, after Cycle 4, each register will have had a turn as being recognized as the active register; and, as such, the a complete run-through the ring will have been completed. As such, between Cycles 4 and 5, the contents of the registers REG1 through REG4 $713_1$ through $713_4$ are shifted 814 forward in the ring by one register unit (i.e., the contents of register REG1 $713_1$ are shifted into register REG2 $713_2$; the contents of register REG2 $713_2$ are shifted into register REG3 $713_3$, etc.). Note that becuase the pointer value being shifted out of register REG4 $714_4$ and into REG1 $714_1$ is an invalid pointer, the pointer value does not need to be incremented. As described in more detail below, incrementing a valid and non exhausted pointer value that has been shifted out of the last register REG4 in the ring is a technique that allows for the generation of more than one address per pointer value that is received from the pointer manager 314.

Referring still to FIG. 6b, observe that from Cycles 5 through Cycle 8, the only valid pointer value held within the ring "P1" is held by the second register REG2 $713_2$ (as a consequence of the shifting that was described just above). As such, according to the methodology of FIG. 8b, the only writing activity to occur from Cycle 5 through Cycle 8 will be when REG2 $713_2$ has access to memory bank 2 $307_2$. From FIG. 6b, this occurs in Cycle 6 (because that is when REG2 $713_2$ exhibits a shaded region). Upon the completion of Cycle 8, the register contents are again shifted 814 which causes the P1 value to be shifted into REG 3 $713_3$. As REG3 $713_3$ is given access to memory bank 3 $703_3$ across Cycles 9 through 12 during Cycle 11, the next writing activity occurs during Cycle 11. After Cycle 12, the register contents are again shifted 814 causing the P1 address value to be shifted into REG4 $713_4$. During the fourth run through the ring over the course of Cycles 13 through 16, according to FIG. 6b, memory bank 4 $703_4$ will be written into during Cycle 16.

After Cycle 16 has been completed, the pointer value "P1" will be shifted 814 out of register $713_4$. Here, even though the value "P1" has been used to write to each memory bank 307, through 3074, recall that a scheme may be used to derive more than one address value per pointer value received from the pointer manager 314. According to the embodiment of FIG. 7, an incrementer 704 is used to increment 814 the value removed from register $307_4$ by one (i.e., "+1"). Here, according to one embodiment, pointer values issued by the pointer manager (such as the value "P1") take the form XXX . . . XX00. That is, the least significant bits are of the form "00". Upon the rotation of the initial pointer value out of the last register $713_4$ after Cycle 16, the least significant pair of bits are incremented from "00" to "01".

Here, referring to FIG. 6b, this means that while Cycles 1 through 16 use an address value of P1 having the form XXX . . . XX00 within the ring, Cycles 17 through 32 will use an address value within the ring of P1* having the form XXX . . . XX01 where the same binary representation is used for the higher order content XXX . . . XX through Cycles 1 through 32. Moreover, the same XXX . . . XX content is used as a basis for pointer value P1 (=XXX . . . XX10) used within the ring during Cycles 33 through 48 and pointer value P1* (=XXX . . . XX11) used within the ring during Cycles 49 through 64. After Cycle 64, however, the basis content XXX . . . XX of the pointer value P1 will be exhausted requiring a fresh pointer from the pointer manager. Note that this will cause the methodology of FIG. 8b to flow through sequence 806 during Cycle 65, wherein, the pointer value P1*** is replaced 806 by the next pointer value that the pointer manager has link listed to pointer P1.

In an embodiment, the ring control logic 701 is configured to return the P1 pointer value (or, at least the XXX . . . XX base content) to the pointer manager as a form of making a request for the next pointer value. Here, the pointer manager can use the returned pointer value when constructing a link-list (e.g., by maintaining a record that links the returned pointer value with the value of a freshly issued pointer value that is sent in response to the returned pointer value). Furthermore, as described in more detail below, the write hub (in various embodiments) may allow a packet to begin to be written into any memory bank (as opposed to a design where all packets "must" begin to be written in the same memory bank (e.g., memory bank 1 $307_1$)). In an embodiment, the write hub 305 is also configured to forward the head pointer for each packet to the request manager 306 along with an indication as to which memory bank is the "starting" memory bank for the packet.

For example, for the packet being stored with respect to FIG. 6b, a data structure of [P1, 00] may be forwarded to the request manager 306 so that the request manager 306 can recognize both the head pointer for the packet and the starting memory bank for the packet (represented by "00" which indicates memory bank 1 $307_1$). The request manager 306 can then include into the grant sent to the arbiter for the packet both its head pointer and its starting memory bank. The reason for including this information in the arbiter request is so that the subsequent grant from the arbiter for the packet will include this same information. By passing this information to the read hub responsible for reading the packet, the read hub will be able to understand both the head pointer for the packet and the starting memory bank for the packet.

The low speed operation discussed so far has focused upon FIG. 6b which corresponds to the basic situation where only one packet from a low speed link needs to be written into memory. FIG. 6c, by contrast, relates to a more complicated environment where the write hub is responsible for managing the writing of those packets received from a plurality of different low speed links. The abundance of invalid pointers associated with the exemplary situation in FIG. 6b may be viewed as unused capacity in the throughput of the write hub 705. FIG. 6c, by contrast, demonstrates an exemplary environment where a plurality of packets are being simultaneously handled. As such, the register space of FIG. 6c is populated with comparatively more valid pointer values than that of FIG. 6b. Note that the methodologies of FIGS. 8a and 8b may still be made to apply to the situation of FIG. 6c.

As mentioned previously above, note that the register ring control logic 701 manipulates a series of multiplexers $702_1$ through $702_4$ that each feed its corresponding register $713_1$ through $713_4$. Multiplexers $702_1$ through $702_4$ give the register ring control logic 701 the ability to "drop in" a pointer value into any of the registers $713_1$ through $713_4$. This capability allows a packet's head buffer (i.e., the packet's first buffer to be written into memory) to be written in any of the four memory banks (as opposed to an architecture that "must" begin writing a head buffer in the first memory bank $307_1$). Better said, a packet can begin to be written into any of memory banks $307_1$ through $307_4$. An example is observed with respect to the second packet that the write hub is asked to manage within the environment observed in FIG. 6c.

Here, note that pointer value "P1" is used to write a first packet into memory; pointer value "P2" is used to write a second packet into memory; pointer value "P3" is used to write a third packet into memory; and, pointer value "P4" is used to write a fourth packet into memory. The first packet of FIG. 6c has: 1) its pointer value "P1" entered into the ring at Cycle 1; and 2) begins to be written into memory during Cycle 1. Moreover, note that a close comparison of FIGS. 6b and 6c reveal that the first packet of FIG. 6c is written in exactly the same sequence as the packet of FIG. 6b. The second packet of FIG. 6c has: 1) its pointer value "P2" entered into the ring at Cycle 3; and 2) begins to be written into memory during Cycle 7. The third packet of FIG. 6c has: 1) its pointer value "P3" entered into the ring at Cycle 7; and 2) begins to be written into memory during Cycle 10. The fourth packet of FIG. 6d has: 1) its pointer value "P4" entered into the ring at Cycle 12; and 2) begins to be written into memory during Cycle 14.

Here, the discrepancy between when a fresh head pointer is first entered into the ring and when a packet first begins to be written is a function of when the fresh head pointer for the packet is received, the state of the ring's register contents when the head pointer is ready to be placed into the ring, and the timing of the particular memory bank access that is granted to the write hub by the scheduler. For example, as in FIG. 6c, because the fresh head pointer P1 is ready to be entered into the ring at Cycle 1 when the register ring is full of invalid pointers—and because the scheduler grants the write hub access to memory bank 1 $307_1$ during the first cycle (as represented by the shading of REG1 during Cycle 1)—the first packet begins to be written during Cycle 1.

By contrast, the second fresh head pointer P2 is ready to be entered into the ring at Cycle 3. In the example of FIG. 6c, this is a consequence of the second packet's arrival and the timing involved in the requesting and issuance of the P2 head pointer to the write hub. Moreover, at Cycle 3, REG1 $713_1$ is already populated with a valid pointer (P1). Storing the P2 value into the "next available" register location at Cycle 3, causes the P2 value to therefore be entered into the ring at REG2 $713_2$. Furthermore, because REG2 had access to its corresponding memory bank during the immediately prior Cycle 2 (noting that no writing activity took place during Cycle 2 because REG2 was populated with an invalid pointer), in accordance with the scheduling strategy of FIG. 6a, the P2 pointer value must wait until Cycle 7 before it is actually used to write the first buffer of data for the second packet.

Here, note that during this "waiting" period, the register holding the P2 value shifts from REG2 $713_2$ to REG3 $713_3$ (between Cycles 4 and 5). The REG3 register $713_3$ is given access to its corresponding memory bank during Cycle 7 which causes the first use of the P2 pointer value since its being entered into the ring back in Cycle 3 (noting that the P2 pointer value first becomes shaded during Cycle 7). Note also, therefore, that the second packet first begins to be written into third memory bank $307_3$. Here, note that a data structure of [P2, 10] may be sent to the request manager so that it can incorporate both the head pointer "P2" for the second packet and the identity of the starting memory bank for the second packet (memory bank 3 $307_3$ represented by the value "10") into the request that is sent to the arbiter.

The third fresh head pointer P3 is ready to be entered into the ring at Cycle 7. Again, in the example of FIG. 6c, this is a consequence of the third packet's arrival and the timing involved in the requesting and issuance of the P3 pointer to the write hub. Note that the REG1 register $713_1$ happens to be available at Cycle 7. Storing the P3 value into the "next available" register location at Cycle 7 causes the P3 value to therefore be entered into the ring at REG1 7131. Similar to the P2 pointer value, the P3 pointer value has to endure a shift into a new register (REG2 7132) between Cycles 8 and 9 before it is actually used to commence the writing of the third packet during Cycle 10. Note, therefore, that the third packet begins to be written into the second memory bank $307_2$. By similar analysis, the fourth pointer value P4 for the writing of the fourth packet is entered into the only available register location at Cycle 12 (REG1 $713_1$), endures a shift into register REG2 $713_2$ between Cycles 12 and 13, and is not used until Cycle 14. Note that, in the example of FIG. 6c, each of the low speed packet streams will receive, on average, one write opportunity for every four cycles.

Before commencing with a discussion of high speed mode operation, referring to FIG. 8b, note that the register ring control logic 701 may be configured to replace 812 a valid pointer value with an invalid pointer value once the packet for which the valid pointer was dedicated is completely written. That is, once a packet is completely written, there is no need for one of its valid pointer values to be circulated within the ring. As such, its pointer value can be replaced with an invalid pointer value after its packet has been completely written into memory. Here, replacing a valid pointer with an invalid pointer is particularly useful if the Rx queue that held the packet became empty upon the packet being completely written into memory. In a further embodiment, the register ring control logic 701 may be designed to replace a pointer value for a completely written packet with a fresh head pointer for the next packet within the Rx queue (should the Rx queue not be empty after the packet is completely written). Note that the ring control logic 701 can recognize that a packet has been completely written by receiving beforehand a "packet size" parameter from the request manager 306 for the packet. That is, by counting the amount of data written into memory for a particular packet, the ring control logic 701 will be able to determine a packet's end boundary from the packet size parameter.

b. High Speed Mode Operation

Referring to FIG. 3, the above discussion related to the low speed operation of the write hub 305. Recall, however, that the write hub 305 (in various embodiments) may be configured to support high speed operation as well. In an embodiment, high speed operation corresponds to a 4× Infiniband speed. Here, according to one approach, the high speed mode triggers a different usage of the Rx queues $304_1$ through $304_4$. More specifically, whereas each Rx queue is used to handle a separate and unique traffic stream in low speed mode (e.g., one unique 1× link per Rx queue); in high speed mode, the traffic from a single high speed link is spread out across each of the Rx queues in a round robin fashion. That is, for example, a first buffer's worth of data from the high speed link is stored into Rx queue $304_1$, a second, next buffer from the high speed link is stored into Rx queue $304_2$; a third, next buffer from the high speed link is stored into Rx queue $304_3$; a fourth, next buffer from the high speed link is stored into Rx queue $304_4$; then, the process repeats such that a fifth, next buffer from the high speed link is stored into Rx queue $304_5$; a sixth, next buffer from the high speed link is stored into Rx queue $304_5$, etc.

FIG. 6d shows the state of the register ring over the course of 16 consecutive cycles in high speed mode; and, FIGS. 9a and 9b shows a high level embodiment and a more detailed embodiment, respectively, of a methodology that may be used to control the operation of the write hub during high speed mode. Referring to FIGS. 6d and 9a, note that one valid pointer value exists in the ring at any time; and, the register contents are shifted once per cycle (rather than once per four cycles as observed in FIGS. 6b and 6c). This difference in operation effectively converts the processing of the write hub toward a single high speed link (as such, only one pointer in the ring at a time) that is operating at four times the speed of a low speed link (hence one shift per cycle) as compared to the low speed mode operation of the hub. That is, note that the packet that pointer "P1" refers to in FIG. 6d enjoys a write to memory every cycle whereas the packet that pointer "P1" referred to in FIGS. 6b and 6c enjoyed a write to memory once every four cycles (on average). As such, the packet being written in FIG. 6c is being written at four times the speed of the packet being written in FIGS. 6b and 6c.

According to the methodology of FIG. 9a, starting at the beginning of the ring at register REG1 $713_1$, the pointer value that is entered at the start of the ring completes a round trip through the ring 902 at a rate of one shift per cycle 905, 906 and 908, 909. As observed in the methodology of FIG. 9a, whether or not the round trip through the ring is spent idling 904 (i.e., no writes) or writing at a rate of one write per cycle 907 (as observed in FIG. 6d) depends upon whether or not the pointer value is invalid or valid. Each time a round trip through the ring is completed (e.g., the pointer value is shifted out of the last register REG4 $713_4$), the pointer value for the next round trip through the ring is determined 903.

FIG. 9b elaborates in more detail on one approach for determining the pointer value for each round trip through the ring. Note that the term "active packet" corresponds to a packet that was being written during the immediately prior round trip through the ring. According to the approach of FIG. 9b, the pointer value is set to a new fresh head pointer 910 if: 1) enough of a subsequent "next" packet exists in the Rx queues behind the active packet being written; and, the active packet has just been completely written during the last run through the ring; or, 2) enough of a "next" packet exists at the head of the Rx queues (in which case an invalid pointer value should have just completed a round trip through the ring). The pointer value is incremented 911 if the active packet has not yet been completely written and the pointer value is not yet exhausted.

The pointer value is set to the next linked-to pointer value for the packet 912 if the active packet has not yet been completely written and the pointer value is exhausted. The pointer value is set to an invalid pointer value 913 if: 1) not enough of a subsequent "next" packet exists in the Rx queues behind the active packet being written; and, the active packet has just been completely written during the last run through the ring; or, 2) not enough of a "next" packet exists at the head of the Rx queues (in which case an invalid pointer value should have just completed a round trip through the ring). With respect to the setting of a fresh head pointer 910 or an invalid pointer 913, "enough" of a next packet may vary from embodiment to embodiment.

According to at least one design approach, it is enough to prevent the writing activity from starving during the next round trip through the ring. For example, for an embodiment where four consecutive writes occur during a next round trip through the ring (as is the case with respect to the approach of FIG. 6d), four buffers worth of information within the Rx queues is guaranteed to be "enough". The "enough" threshold may be less than the number of writes that follow in the next round trip however depending on the timing/efficiency of the design. In a highly efficient design, just one buffer worth's of information is enough to allow a packet to begin to be written. Note also that the high speed mode can be configured such that all packets may begin to be written in the first memory bank.

Lastly, note that the embodiments discussed above with respect to FIGS. 9a and 9b may be construed so as to correspond to an approach where a high speed mode write must start with the first register 703, in the register ring (i.e., a packet's head pointer must first be used from register 703, of FIG. 7 during high speed mode). It is important to realize that alternative embodiments may be readily engineered where a packet may begin to be written from a register other than the first register in the ring (and therefore may first begin to be written into any of the memory banks rather than only a particular memory bank) through slight modification of the low speed methodology observed in FIGS. 8a and 8b.

In particular, FIG. 8a can be modified to describe a "write first into any bank" high speed mode hub simply by removing sequence 854 (so that the "yes" output of sequence 853 directly feeds sequence 850) and inserting sequence 854 between sequences 852 and 853 (so that sequence 852 feeds sequence 854; and, sequence 854 feeds sequence 853). Moreover, FIG. 8b can be modified to describe a more detailed implementation of a "write first into any bank" high speed mode hub simply by: 1) moving sequence 814 to just prior to sequence 813 in the observed method flow (to ensure that the register contents are shifted once per cycle tick regardless if a write operation is 811 or is not 809 performed); 2) changing the definition of active Rx queue in sequence 803 to read "Active Rx Queue=The Rx queue where the next buffer to be written of the active packet is stored". Moreover, for a write hub capable of handling the writing of only a single packet at a time it should be understood that only a single valid pointer should be in the ring.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a write hub having a plurality of registers, each one of said registers to help generate a write address to a different memory bank from amongst a plurality of memory banks, each of said registers arranged in a ring so that each register can pass a pointer value toward a next register within said ring, said ring of registers further comprising a multiplexer between each of said registers, each multiplexer having an output path that flows toward a next register within said ring relative to said multiplexer, each multiplexer to introduce a pointer value to said ring at said next register within said ring.

2. The apparatus of claim 1 wherein each pointer value within said ring is either an invalid pointer value or a valid pointer value, wherein an invalid pointer prevents a write operation into the memory bank that the register holding said valid pointer value is to help generate a write address for, and wherein, a valid pointer value is a condition for a write operation into the memory bank that the register holding said valid pointer value is to help generate a write address for.

3. The apparatus of claim 2 wherein each unique valid pointer value is used as a corresponding unique write address.

4. The apparatus of claim 1 wherein said write hub further comprises a mode of operation wherein said write hub:
1) for every cycle of operation: focuses upon a next register within said ring; and,
2) for every N cycles of operation: together shifts forward, by one register position within said ring, all pointer values within said ring, wherein, N is the number of registers within said ring.

5. The apparatus of claim 4 wherein, when a particular register is focused upon by said write hub, a write operation is performed into the particular memory bank that said focused upon register is to help generate a write address for if:
1) said write hub has been given access to said particular memory bank; and
2) said focused upon register is holding a valid pointer value.

6. The apparatus of claim 5 wherein whether or not said write hub has been given access to said particular memory bank is controlled by a scheduler unit.

7. The apparatus of claim 6 wherein said scheduler further comprises a second plurality of registers arranged in a ring, each one of said registers from said second plurality of registers corresponding to a different one of said memory banks and to control access to its corresponding memory bank.

8. The apparatus of claim 5 wherein, as part of said focus being placed upon said focused upon register, said write hub replaces said valid pointer value with an invalid pointer value if:
1) a packet for whom said valid pointer was devoted is finally written into said memory banks as a consequence of said write operation; and,
2) a lead buffers worth of data has not yet been received for a next packet to be written into said memory banks.

9. The apparatus of claim 4 wherein, when a particular register is focused upon by said write hub, said write hub replaces an invalid pointer value with a fresh head pointer value within said focused upon register if:
1) said focused upon register contains an invalid pointer; and,
2) a lead buffer's worth of data has been received for packet for whom said fresh head pointer is devoted.

10. The apparatus of claim 9 wherein after said invalid pointer value is replaced with said fresh head pointer value within said focused upon register, a write operation is performed into the particular memory bank that said focused upon register is to help generate a write address for if said write hub has been given access to said particular memory bank.

11. The apparatus of claim 9 wherein said write hub is coupled to a pointer manager that sends said fresh head pointer value to said write hub.

12. The apparatus of claim 4 wherein, when a particular register is focused upon by said write hub, said write hub replaces the pointer value within said focused upon register with a next linked-to pointer if said pointer value within said focused upon register is exhausted, said next linked-to pointer devoted to the same packet that said exhausted pointer value was devoted to.

13. The apparatus of claim 12 wherein said register ring further comprises an incrementer between a pair of consecutive registers within said ring, said incrementer to increment a pointer value for each round trip taken through said ring, said pointer value having a plurality of lower order bits reserved for being incremented by said incrementer, said pointer value deemed exhausted when a write address has been generated with each unique combination of said lower order bits.

14. The apparatus of claim 12 wherein after said exhausted pointer value is replaced with said next linked-to pointer value within said focused upon register, a write operation is performed into the particular memory bank that said focused upon register is to help generate a write address for if said write hub has been given access to said particular memory bank.

15. The apparatus of claim 14 wherein said write hub is coupled to a pointer manager that sends said next-linked to pointer value to said write hub, said pointer manager to manage a link-list for said packet.

16. The apparatus of claim 4 wherein said mode of operation is a low speed mode of operation that can simultaneously handle N different packets that are each received from N different low speed links.

17. The apparatus of claim 16 wherein said low speed links are Infiniband 1× links.

18. The apparatus of claim 17 wherein N=4.

19. The apparatus of claim 4 wherein said write hub further comprises a second mode of operation wherein said write hub circulates one valid pointer value within said ring, said one valid pointer value shifted forward to a next register within said ring for each cycle of operation to cause one write address to be generated per cycle of operation, each write address targeted at the particular memory bank that said next register holding said valid pointer value is to help generate a write address for.

20. The apparatus of claim 19 wherein said write hub replaces, within said ring, said one valid pointer value with a fresh head pointer value if:
   1) said one valid pointer has completed a round trip through said ring; and,
   2) enough of a next packet has been received to commence writing said next packet into said memory banks; and
   3) a packet for whom said one valid pointer was devoted is completely written into said memory banks.

21. The apparatus of claim 19 wherein said write hub increments said one valid pointer and circulates said incremented pointer value through said ring if:
   1) said one valid pointer value has completed a round trip through said ring; and,
   2) said one valid pointer value is not yet deemed an exhausted pointer value; and,
   3) a packet for whom said one valid pointer value was devoted is not completely written into said memory banks.

22. The apparatus of claim 19 wherein said write hub replaces, within said ring, said one valid pointer value with a next linked to pointer value if:
   1) said one valid pointer value has completed a round trip through said ring; and,
   2) said one valid pointer value is deemed an exhausted pointer value; and,
   3) a packet for whom said one valid pointer value was devoted is not completely written into said memory banks.

23. The apparatus of claim 19 wherein said write hub replaces, within said ring, said one valid pointer value with an invalid pointer value if:
   1) said one valid pointer has completed a round trip through said ring; and,
   2) enough of a next packet has not yet been received to commence writing said next packet into said memory banks; and
   3) a packet for whom said one valid pointer was devoted is completely written into said memory banks.

24. The apparatus of claim 19 wherein said second mode of operation is a high speed mode of operation that can handle one packet received from one high speed link.

25. The apparatus of claim 24 wherein said high speed link is an Infiniband high speed link.

26. The apparatus of claim 25 wherein said high speed link is a 4× Infiniband high speed link.

27. The apparatus of claim 1 wherein said write hub is part of an input port that writes packets received from one or more links into said memory banks, said input port further comprising a request manager that:
   1) generates a request data structure for each of said packets; and,
   2) sends each request data structure to an arbiter unit, said arbiter unit to decide when each packet is to be read from said memory banks so that it can be forwarded to a switch core.

28. The apparatus of claim 27 wherein said request data structure further comprises:
   1) a head pointer value for its corresponding packet; and
   2) an indication as to which memory bank amongst said plurality of memory banks that a first piece of said corresponding packet was written into.

29. The apparatus of claim 28 wherein said request data structure further comprises;
   1) the size of said corresponding packet; and
   2) the destination address of said corresponding packet.

30. The apparatus of claim 27 wherein said input port further comprises a scheduler to scheduler reading and writing activity across said memory banks, said scheduler having an input where a grant is received from said arbiter for each of said packets.

31. An apparatus, comprising:
   a write hub having a plurality of registers, each one of said registers to help generate a write address to a different memory bank from amongst a plurality of memory banks, each of said registers arranged in a ring so that each register can pass a pointer value toward a next register within said ring, said ring of registers further comprising a multiplexer between each of said registers, each multiplexer having an output path that flows toward a next register within said ring relative to said multiplexer, each multiplexer to introduce a pointer value to said ring at said next register within said ring, said write hub having a first mode of operation and a second mode of operation wherein:
   in said first mode of operation said write hub:
   1) for every cycle of operation: focuses upon a next register within said ring to cause a write address to be generated for the particular memory bank that said focused upon register is to help generate a write address for if:
      a) said write hub has been given access to said particular memory bank and
      b) said focused upon register is holding a valid pointer value;
   2) for every N cycles of operation: together shifts forward, by one register position within said ring, all pointer values within said ring, wherein, N is the number of registers within said ring;
   in said second mode of operation said write hub:
   circulates one valid pointer value within said ring, said one valid pointer value shifted forward to a next register within said ring for each cycle of operation to cause one write address to be generated per cycle of operation for a packet for whom said one valid pointer value is devoted, each write address targeted at the particular memory bank that said next register holding said valid pointer value is to help generate a write address for.

32. The apparatus of claim 31 wherein each unique valid pointer value is used as corresponding unique write address.

33. The apparatus of claim 31 wherein, within said first mode of operation, whether or not said write hub has been given access to said particular memory bank is controlled by a scheduler unit.

34. The apparatus of claim 33 wherein said scheduler unit further comprises a second plurality of registers arranged in a ring, each one of said registers from said second plurality of registers corresponding to a different one of said memory banks and to control access to its corresponding memory bank.

35. The apparatus of claim 30 wherein, within said first mode of operation, as part of said focus being placed upon said focused upon register, said write hub replaces said valid pointer value with an invalid pointer value if:
   1) a packet for whom said valid pointer value was devoted is finally written into said memory banks as a consequence of a write operation being performed commensurate with said generation of said write address; and, 2) a lead buffer's worth of data has not yet been received for a next packet to be written into said memory banks.

36. The apparatus of claim 30 wherein, within said first mode of operation, when a particular register is focused upon by said write hub, said write hub replaces an invalid pointer value with a fresh head pointer value within said focused upon register if:
   1) said focused upon register contains an invalid pointer, and,
   2) a lead buffer's worth of data has been received for packet for whom said fresh head pointer is devoted.

37. The apparatus of claim 36 wherein after said invalid pointer value is replaced with said fresh head pointer value within said focused upon register, a write operation is performed into the particular memory bank that said focused upon register is to help generate a write address for if said write hub has been given access to said particular memory bank.

38. The apparatus of claim 36 wherein said write hub is coupled to a pointer manager that sends said fresh head pointer value to said write hub.

39. The apparatus of claim 30 wherein, within said first mode of operation, when a particular register is focused upon by said write hub, said write hub replaces the pointer value within said focused upon register with a next linked-to pointer if said pointer value within said focused upon register is exhausted, said next linked to pointer devoted to the same packet that said exhausted pointer value was devoted to.

40. The apparatus of claim 39 wherein said register ring further comprises an incrementer between a pair of consecutive registers within said ring, said incrementer to increment a pointer value for each round trip taken through said ring, said pointer value having a plurality of lower order bits reserved for being incremented by said incrementer, said pointer value deemed exhausted when a write address has been generated with each unique combination of said lower order bits.

41. The apparatus of claim 39 wherein after said exhausted pointer value is replaced with said next linked-to pointer value within said focused upon register, a write operation is performed into the particular memory bank that said focused upon register is to help generate a write address for if said write hub has been given access to said particular memory bank.

42. The apparatus of claim 41 wherein said write hub is coupled to a pointer manager that sends said next-linked to pointer value to said write hub, said pointer manager to manage a link-list for said packet.

43. The apparatus of claim 30 wherein, within said second mode of operation, said write hub replaces, within said ring, said one valid pointer value with a fresh head pointer value if:
   1) said one valid pointer has completed a round trip through said ring; and,
   2) enough of a next packet has been received to commence writing said next packet into said memory banks; and
   3) a packet for whom said one valid pointer was devoted is completely written into said memory banks.

44. The apparatus of claim 30 wherein, within said second mode of operation, said write hub increments said one valid pointer and circulates said incremented pointer value through said ring if:
   1) said one valid pointer value has completed a roundtrip through said ring; and,
   2) said one valid pointer value is not yet deemed an exhausted pointer value; and,
   3) a packet for whom said one valid pointer value was devoted is not completely written into said memory banks.

45. The apparatus of claim 30 wherein, within said second mode of operation, said write hub replaces, within said ring, said one valid pointer value with a next linked to pointer value if:
   1) said one valid pointer value has completed a roundtrip through said ring; and,
   2) said one valid pointer value is deemed an exhausted pointer value; and,
   3) a packet for whom said one valid pointer value was devoted is not completely written into said memory banks.

46. The apparatus of claim 30 wherein, within said second mode of operation, said write hub replaces, within said ring, said one valid pointer value with an invalid pointer value if:
   1) said one valid pointer has completed a round trip through said ring; and,
   2) enough of a next packet has not yet been received to commence writing said next packet into said memory banks; and
   3) a packet for whom said one valid pointer was devoted is completely written into said memory banks.

47. The apparatus of claim 30 wherein said first mode of operation is a low speed mode of operation that can simultaneously handle N different packets that are each received from N different low speed links.

48. The apparatus of claim 47 wherein said low speed links are Infiniband 1× links.

49. The apparatus of claim 48 wherein N=4.

50. The apparatus of claim 30 wherein said second mode of operation is a high speed mode of operation that can handle one packet received from one high speed link.

51. The apparatus of claim 50 wherein said high speed link is an Infiniband high speed link.

52. The apparatus of claim 51 wherein said high speed link is a 4× Infiniband high speed link.

53. The apparatus of claim 30 wherein said write hub is part of an input port that writes packets received from one or more links into said memory banks, said input port further comprising a request manager that:
   1) generates a request data structure for each of said packets; and,
   2) sends each request data structure to an arbiter unit, said arbiter unit to decide when each packet is to be read from said memory banks so that it can be forwarded to a switch core.

54. The apparatus of claim 53 wherein said request data structure further comprises:
   1) a head pointer value for its corresponding packet; and
   2) an indication as to which memory bank amongst said plurality of memory banks that a first piece of said corresponding packet was written into.

55. The apparatus of claim 54 wherein said request data structure further comprises;
   1) the size of said corresponding packet; and
   2) the destination address of said corresponding packet.

56. The apparatus of claim 53 wherein said input port further comprises a scheduler to scheduler reading and writing activity across said memory banks, said scheduler having an input where a grant is received from said arbiter for each of said packets.

57. A method, comprising:
   for every cycle of operation:

at a next register within a ring of registers, each one of said registers to help generate a write address to a different memory bank from amongst a plurality of memory banks, causing a write address to be generated for the particular memory bank that said next register is to help generate a write address for if:
- a) access has been given to said particular memory bank and
- b) said next register is holding a valid pointer value; and for every N cycles of operation:
  together shifting forward, by one register position within said ring, all pointer values within said ring, wherein, N is the number of registers within said ring.

58. The method of claim 57 wherein each unique valid pointer value is used as a corresponding unique write address.

59. The method of claim 57 further comprising circulating values within a second ring of registers to control access to said particular memory bank, one of said values to specify which one of said memory banks can be written to.

60. The method of claim 57 further comprising, as a consequence of a write operation being performed that finishes the writing of a packet into said memory banks wherein said writing of said packet is commensurate with said write address being generated, replacing said valid pointer value with an invalid pointer value within said next register if an amount of data from a next packet to be written into said memory banks has not yet been received in a sufficient quantity to start writing said next packet into said memory banks.

61. The method of claim 57 further comprising, if said next register contains an invalid pointer value, replacing said invalid pointer value with a fresh head pointer value if an amount of data from a packet for whom said fresh head pointer is devoted has been received in a sufficient quantity to start writing said packet into said memory banks.

62. The method of claim 61 further comprising, if access has been given to the particular memory bank that said next register is to help generate a write address for, generating a write address with said fresh head pointer after said invalid pointer value is replaced with said fresh head pointer value, said write address being part of a write operation that writes a lead buffer's worth of data from said packet into said particular memory bank.

63. The method of claim 61 further comprising receiving said fresh head pointer value from a pointer manager prior to its placement into said next register.

64. The method of claim 57 further comprising replacing, within said focused upon register, said valid pointer value with a next linked-to pointer value if said valid pointer value within said next register is exhausted, said next linked-to pointer value devoted to the same packet that said exhausted pointer value was devoted to.

65. The method of claim 57 further comprising incrementing a pointer value for each round trip taken through said ring, said pointer value having a plurality of lower order bits reserved for being incremented, each pointer value deemed exhausted when a write address has been generated with each unique combination of said lower order bits.

66. The method of claim 65 further comprising after said exhausted pointer value is replaced with said next linked-to pointer value within said next register, if access has been given to said particular memory bank that said next register is to help generate a write address for, performing a write operation into said particular memory bank that said next register is to help generate a write address for.

67. The method of claim 66 further comprising receiving said next-linked to pointer value from a pointer manager that manages a link-list for said packet.

68. The apparatus of claim 57 further comprising handling N different packets that are each received from N different low speed links.

69. The apparatus of claim 68 wherein said low speed links are Infiniband 1× links.

70. The apparatus of claim 69 wherein N=4.

71. The method of claim 57 further comprising: changing a mode of operation to perform a second method, said second method comprising:
  circulating one valid pointer value within said ring, said one valid pointer value shifted forward to a next register within said ring for each cycle of operation to cause one write address to be generated per cycle of operation for a packet for whom said one valid pointer value is devoted, each write address targeted at the particular memory bank that said next register holding said valid pointer value is to help generate a write address for.

72. The method of claim 71 wherein said second method can handle one packet received from one high speed link.

73. The method of claim 72 wherein said high speed link is an Infiniband high speed link.

74. The method of claim 73 wherein said high speed link is a 4× Infiniband high speed link.

75. The method of claim 71 wherein said second method further comprises:
  replacing, within said ring, said one valid pointer value with a fresh head pointer value if:
    1) said one valid pointer has completed a round trip-through said ring; and,
    2) enough of a next packet has been received to commence writing said next packet into said memory banks; and
    3) a packet for whom said one valid pointer was devoted is completely written into said memory banks.

76. The method of claim 71 wherein said second method further comprises:
  incrementing said one valid pointer and circulating said incremented pointer value through said ring if:
    1) said one valid pointer value has completed a round trip through said ring; and,
    2) said one valid pointer value is not yet deemed an exhausted pointer value; and,
    3) a packet for whom said one valid pointer value was devoted is not completely written into said memory banks.

77. The method of claim 71 wherein said second method further comprises:
  replacing, within said ring, said one valid pointer value with a next linked to pointer value if:
    1) said one valid pointer value has completed a round trip through said ring; and,
    2) said one valid pointer value is deemed an exhausted pointer value; and,
    3) a packet for whom said one valid pointer value was devoted is not completely written into said memory banks.

78. The method of claim 71 wherein said second method further comprises:
  replacing, within said ring, said one valid pointer value with an invalid pointer value if:

1) said one valid pointer has completed a round trip through said ring; and,
2) enough of a next packet has not yet been received to commence writing said next packet into said memory banks; and
3) a packet for whom said one valid pointer was devoted is completely written into said memory banks.

79. The method of claim 57 further comprising:
1) generating a request data structure for a packet to be written into said memory banks; and,
2) sending said request data structure to an arbiter unit, said arbiter unit to decide when said packet is to be read from said memory banks so that it can be forwarded to a switch core.

80. The method of claim 79 wherein said request data structure further comprises:
1) a head pointer value for its corresponding packet; and
2) an indication as to which memory bank amongst said plurality of memory banks that a first piece of said packet was written into.

81. The method of claim 79 wherein said request data structure further comprises;
1) the size of said packet; and
2) the destination address of said packet.

82. A machine readable medium having stored thereon a computer program and a description of a circuit, the computer program comprising executable instructions that when executed by a processor direct the processor to emulate the operation of the circuit, said operation comprising:

using a write hub having a plurality of registers, each one of said registers configured to help generate a write address to a different memory bank from amongst a plurality of memory banks, each of said registers arranged in a ring;

passing a pointer value toward a next register within said ring, said ring of registers further comprising a multiplexer between each of said registers, each multiplexer having an output path that flows toward a next register within said ring relative to said multiplexer, each multiplexer configured to introduce a pointer value to said ring at said next register within said ring; and causing a write address to be generated for the particular memory bank that said next register is to help generate a write address for if:
a) access has been given to said particular memory bank and
b) said next register is holding a valid pointer value; and for every N cycles of operation: together shifting forward, by one register position within said ring, all pointer values within said ring, wherein, N is the number of registers within said ring.

83. The machine readable medium of claim 82 wherein said description is within a VHDL format.

84. The machine readable medium of claim 82 wherein said description is within a Verilog format.

85. The machine readable medium of claim 82 where said description is a gate level netlist.

\* \* \* \* \*

UNITED STATES PATENT AND TRADEMARK OFFICE
CERTIFICATE OF CORRECTION

PATENT NO. : 7,124,241 B1 Page 1 of 1
APPLICATION NO. : 10/431875
DATED : October 17, 2006
INVENTOR(S) : Rick Reeve et al.

It is certified that error appears in the above-identified patent and that said Letters Patent is hereby corrected as shown below:

Column 24, Line 8, Claim 8, delete "buffers" and insert -- buffer's --;

Column 24, Line 52, Claim 15, delete "next-linked to" and insert -- next linked-to --;

Column 26, Line 49, Claim 32, delete "used as" and insert -- used as a --;

Column 27, Line 8, Claim 36, delete "pointer," and insert -- pointer; --;

Column 27, Line 47, Claim 42, delete "next-linked to" and insert -- next linked-to --;

Column 27, Line 66, Claim 44, delete "roundtrip" and insert -- round trip --;

Column 28, Line 10, Claim 45, delete "roundtrip" and insert -- round trip --;

Column 30, Line 4, Claim 67, delete "next-linked to" and insert -- next linked-to --.

Signed and Sealed this

Seventeenth Day of August, 2010

David J. Kappos
*Director of the United States Patent and Trademark Office*